(12) United States Patent
Tsuyama et al.

(10) Patent No.: US 7,523,199 B2
(45) Date of Patent: Apr. 21, 2009

(54) DISTRIBUTING AN INFORMATION IMAGE

(75) Inventors: Fumio Tsuyama, Kanagawa (JP); Noriyuki Murata, Tokyo (JP)

(73) Assignee: Sony Corporation, Tokyo (JP)

( * ) Notice: Subject to any disclaimer, the term of this patent is extended or adjusted under 35 U.S.C. 154(b) by 793 days.

(21) Appl. No.: 10/478,469

(22) PCT Filed: Mar. 25, 2003

(86) PCT No.: PCT/JP03/03644

§ 371 (c)(1), (2), (4) Date: Nov. 21, 2003

(87) PCT Pub. No.: WO03/081439

PCT Pub. Date: Oct. 2, 2003

(65) Prior Publication Data
US 2005/0055451 A1   Mar. 10, 2005

(30) Foreign Application Priority Data
Mar. 25, 2002   (JP)   ............................. 2002-084410

(51) Int. Cl.
G06F 15/173 (2006.01)
G06F 15/16 (2006.01)
G06F 17/30 (2006.01)

(52) U.S. Cl. .................. 709/225; 709/217; 709/229; 726/28; 726/29; 726/31

(58) Field of Classification Search ............... 709/225, 709/229, 217; 726/28, 29, 31
See application file for complete search history.

(56) References Cited

U.S. PATENT DOCUMENTS 5,598,524 A * 1/1997 Johnston et al. ............. 715/769
5,724,578 A * 3/1998 Morinaga et al. ........... 707/100
5,999,766 A * 12/1999 Hisatomi et al. .............. 399/80
6,049,799 A    4/2000 Mangat et al.
6,496,206 B1 * 12/2002 Mernyk et al. .............. 715/835

(Continued)

FOREIGN PATENT DOCUMENTS

JP   10-188390   7/1998

(Continued)

*Primary Examiner*—Kevin Bates
(74) *Attorney, Agent, or Firm*—Finnegan, Henderson, Farabow, Garrett & Dunner, L.L.P.

(57) ABSTRACT

There is provided an information image utilizing system for setting in detail access rights with respect to performing communications and sending and receiving information through a user information image, which specifies a communication destination user or the like and performs communications and sending and receiving information, and performing authentication based on such access rights.

A client (105) requests an information image managing server (102) to provide ownership information of a user information image of its own. The information image managing server (102) extracts user IDs of owners of the user information image and attribute information of copy information image data corresponding to those owners from an information image managing table. The server (102) sends the user IDs and the attribute information to the client (105). When an instruction to change the attribute information or delete the copy information image is sent from the client (105), the information image managing server (102) updates the contents of the information image managing table. The information image managing server (102) sends the updated contents to a folder managing server (103) to update the contents of a folder managing table.

17 Claims, 17 Drawing Sheets

U.S. PATENT DOCUMENTS

| | | |
|---|---|---|
| 6,662,198 B2 * | 12/2003 | Satyanarayanan et al. ... 707/204 |
| 6,882,979 B1 * | 4/2005 | Reay et al. .................... 705/26 |
| 6,892,201 B2 * | 5/2005 | Brown et al. .................... 707/9 |
| 6,895,503 B2 * | 5/2005 | Tadayon et al. ............. 713/168 |
| 6,910,022 B2 * | 6/2005 | Stefik et al. ................... 705/50 |
| 7,068,309 B2 * | 6/2006 | Toyama et al. ........... 348/231.5 |
| 7,110,982 B2 * | 9/2006 | Feldman et al. ............... 705/51 |
| 7,149,750 B2 * | 12/2006 | Chadwick ............... 707/103 R |
| 7,269,577 B2 * | 9/2007 | Stefik et al. ................. 713/167 |
| 2004/0064692 A1 * | 4/2004 | Kahn et al. ................. 713/167 |

FOREIGN PATENT DOCUMENTS

| | | |
|---|---|---|
| JP | 11-259393 | 9/1999 |
| JP | 2000-253042 | 9/2000 |
| JP | 2001-092575 | 4/2001 |
| JP | 2001-142825 | 5/2001 |
| JP | 2001-216713 | 8/2001 |
| JP | 2001-337884 | 12/2001 |
| JP | 2002-41392 | 2/2002 |
| JP | 2002-041392 | 2/2002 |
| JP | 2002-51322 | 2/2002 |
| JP | 2002-63467 | 2/2002 |
| JP | 2002-063467 | 2/2002 |
| JP | 2002-163167 | 6/2002 |
| JP | 2003-284031 | 10/2003 |
| JP | 3622913 | 12/2004 |

* cited by examiner

F I G. 3
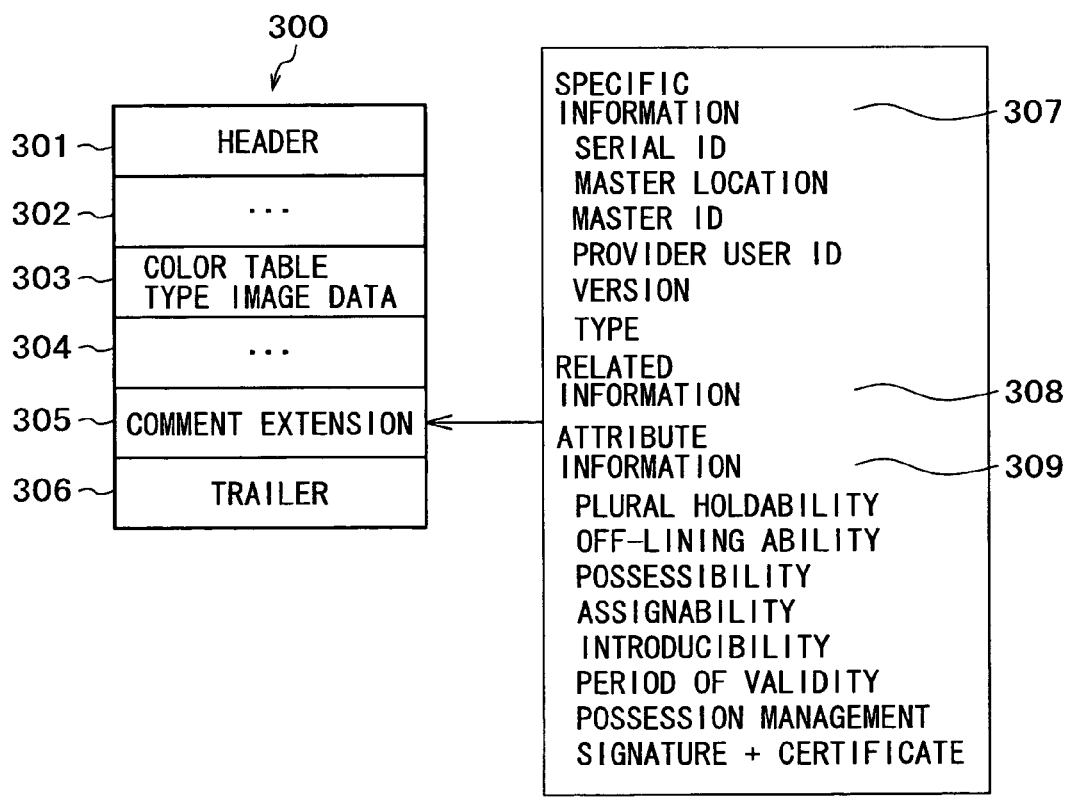

FIG. 6

```
<icon
        title= "GOING HOME"
601 ─ icon_id="fuon://fuon.ccc.co.jp/icon/uuu/go-home"
602 ─ version="1"
603 ─ category="content_icon"
604 ─ own="disable"
605 ─ offline="enable"
606 ─ recommend="enable">
   ...
<action event="offline">
 <property sequence="1" property_id="6"/>
</action>

607 ─ <property
        property_id="1"
        visible="true"
        title="OOO  OFFICIAL HP"

<reference
        content_type="text/html;relative"
        location="fuon://fuon.ccc.co.jp/ref/uuu/intro_html_url"
        condition="default"
    />
</property>

608 ─ <property
        property_id="5"
        visible="true"
        title="REPRODUCTION"
        valid_condition="required_private_data:streaming_key;..."

...
<reference
        content_type="audio/x-pn-realaudio;relative"
        location="fuon://fuon.ccc.co.jp/ref/uuu/pn_ra_param"
        valid_condition="required_private_data:streaming_key;..."
    />
</property>

...
</icon>
```

FIG. 9

| USER ID | MASTER ID OR SERIAL ID |
|---|---|
| U01 | M01, SU21, SC31 |
| U02 | M02, SC40 |
| U03 | M03, S001 |

F I G. 1 2
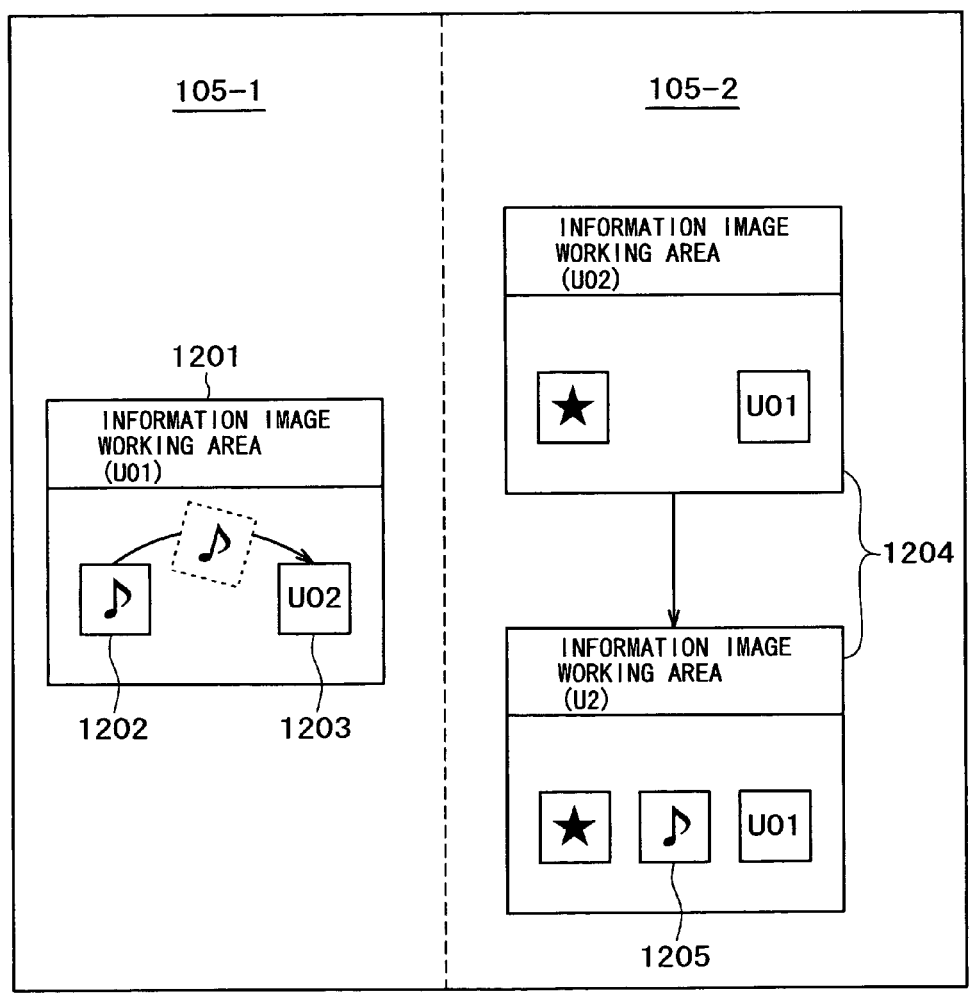

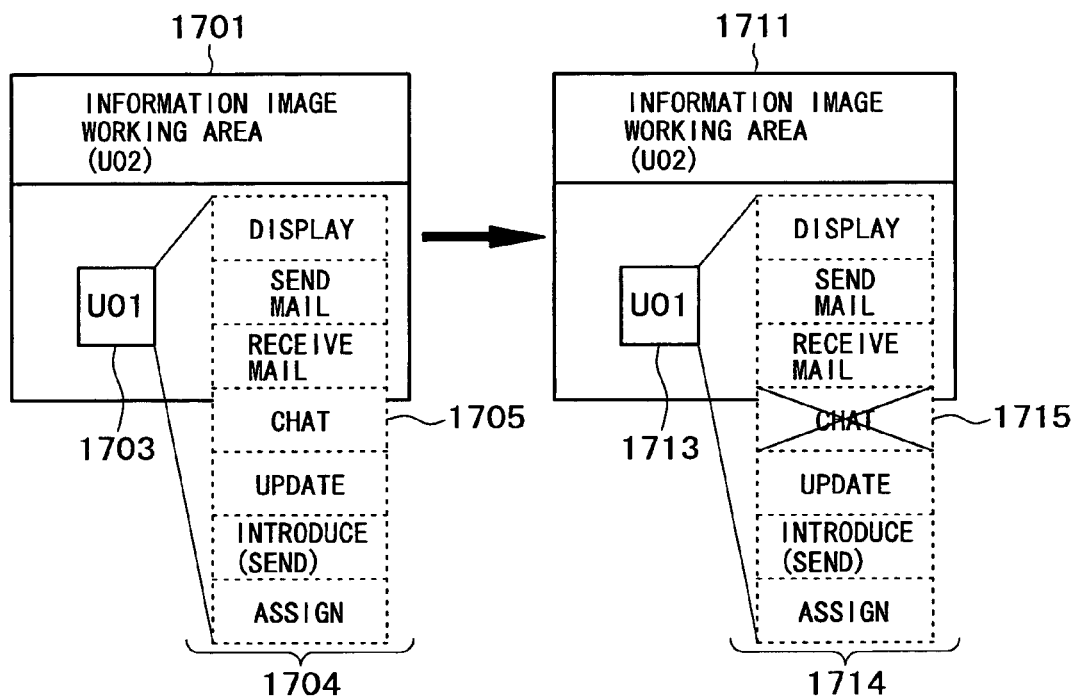

DISTRIBUTING AN INFORMATION IMAGE

TECHNICAL FIELD

The present invention relates to the manipulation of information between information processing apparatus such as computers that are interconnected by a network such as the Internet. More specifically, the present invention is concerned with an information image utilizing system or the like for utilizing "information image", which includes, as a unit to be handled, image information, related information for an operator to bring about a certain operation based on the image information, attribute information, which defines how to handle information with respect to the image information, or the like.

BACKGROUND ART

In recent years, it has become the daily practice for the general users to connect a computer to a network, acquire various items of information through the network, and communicate between computers through the network for exchanging information. Various interfaces have been proposed in the art for smoothly and easily sending and receiving information through the network and performing communications between computers. For example, the bookmark function (bookmark) of a browser and the communication destination holding function (address book) of communication software may be referred to as an interface for efficiently acquiring information, sending and receiving information, and performing communications through the network.

There has been proposed a process of using "information image" which includes, as a unit to be handled, image information and related information to bring about a certain operation based on the image information, as a process of acquiring information and performing communications more effectively on the Internet. The information image can easily be managed as it allows an image file and a plurality of items of related information to be managed as a unit to be handled.

With respect to sending and receiving information and performing communications through a network, Japanese Patent Laid-open No. Hei 11-259393 discloses a system for displaying a user information image with which to identify a party to communicate with on the display screen of a personal computer and manipulating the information image to make a telephone call or sending electronic mail.

Japanese Patent Laid-open No. Hei 06-223086 reveals a card managing system providing a database center for managing cards, which is accessible by members, for registering and changing card information on the part of card owners.

With regard to the right to access information, Japanese Patent Laid-open No. 2000-253042 shows an information access right managing system, which has a database for managing rights to access information as to electronic cards and allows persons who generates such electronic cards to set rights to access disclosed information.

However, if a link destination or a communication destination for an information image limits an access period or contents of information to be provided, then it is difficult in an information image (user information image) for specifying a communication destination user or the like, performing communications, and sending and receiving information, to set in detail access rights with respect to performing communications and sending and receiving information through such an information image and to perform authentication based on such access rights.

An information image is generally free to duplicate, and duplications are identical to each other. Therefore, persons who have acquired such duplications cannot be distinguished from each other, and they can enjoy the same interests regarding the information image as with the original owner of the information image. Stated otherwise, it is difficult to grasp the real owner of the information image and to set access rights for respective owners of information images.

If an information image has a plurality of utilization items (predetermined operations), then it is difficult to set access rights for the respective utilization items (predetermined operations).

It is also difficult to change the setting of access rights at any desired times such as after the information image has been provided.

For example, there has been no means for an information provider to limit and manage each user in sending an information image that the user owns as an attachment to a mail or storing such an information image in a flexible disk and taking out the flexible disk. Once an information image has been provided to a user, the utilization period of the information image cannot be changed and any limitation on its ownership cannot be changed (e.g., a limitation that inhibits the user to assign the information image to another when the information image is provided cannot be changed to allow the user to assign the information image after elapse of a certain period of time) after the information image is provided. Furthermore, there has been no means for an information image provider to stop only a particular user from utilizing the information image. In particular, it is difficult to grasp the ownership of a user who has acquired an information image by way of duplication, and it is extremely difficult to take an action such as to stop utilizing such an information image for a retrospective reason.

Japanese Patent Laid-open No. Hei 11-259393 shows no functions about a limitation on connecting to an icon and authentication and contains no description as to the grasping of a real owner of an icon.

Japanese Patent Laid-open No. Hei 06-223086 attempts to provide a convenience in updating card information only and contains no description as to limiting access to card information.

The information access right managing system disclosed in Japanese Patent Laid-open No. 2000-253042 has a database for managing rights to access information as to electronic cards. The major function that electronic cards have is limited to the disclosure of information via the electronic cards (a function to refer to information), and the publication contains no description about sending and receiving information via the electronic cards. About the acquisition of an electronic card, only a process of individually acquiring an electronic card from a person who has produced the electronic card is described in the publication. The disclosed system lacks flexibility in promoting the providing of information and accelerating the spreading of a human network.

The present invention has been made in view of the above problems. It is an object of the present invention to provide an information image utilizing system, which is capable of, in an information image (user information image) for specifying a communication destination user or the like, performing communications, and sending and receiving information, setting in detail access rights with respect to performing communications and sending and receiving information through such an information image and to perform authentication based on such access rights.

DISCLOSURE OF INVENTION

In order to achieve the above object, according to a first invention, there is provided an information image utilizing system having one or plural information image managing servers, one or plural folder managing servers, a user managing server, and one or plural clients, which are interconnected by a network, for sending and receiving information between the clients through an information image including, as a unit to be handled, image information and related information for bringing about a predetermined action based on the image information, characterized in that (a) the one or plural information image managing servers generate and hold a first information image by including specific information including an identifier of a first client in the information image, generate and hold a second information image by including attribute information representative of an access right for each identifier of a second client as an owner and each the predetermined action, in the first information image, and hold an information image managing table, which associates an identifier of the first information image, the identifier of the first client, an identifier of the second information image, and the identifier of the second client with each other, (b) the one or plural folder managing servers hold a folder managing table, which associates the identifier of the second client and the identifier of the second information image owned by the second client with each other, (c) the user managing server authenticates the clients and holds a user managing table, which associates the identifiers of the clients and the folder managing servers with each other, and (d) the clients communicate with the folder managing servers, displays the second information images owned by the clients, and performs the predetermined action based on the related information and the attribute information, which are contained in the second information image.

According to the first invention, the one or plural information image managing servers generate and hold a first information image by including specific information including an identifier (a provider user ID) of a first client in an information image, generate and hold a second information image by including attribute information representative of an access right for each identifier (an owner user ID) of a second client as an owner and each the predetermined action, in the first information image, and hold an information image managing table, which associates an identifier (a master ID) of the first information image, the identifier (the provider user ID) of the first client, an identifier (a serial ID) of the second information image, and the identifier (the owner user ID) of the second client with each other.

The one or plural folder managing servers hold a folder managing table, which associates the identifier (the owner user ID) of the second client and the identifier (the serial ID) of the second information image owned by the second client with each other.

The user managing server authenticates the clients and holds a user managing table, which associates the identifiers (user IDs) of the clients and the folder managing table with each other.

The clients communicate with a folder manager, displays the second information images owned thereby, and performs the predetermined action based on the related information and the attribute information, which are contained in the second information image.

When the contents of the folder managing table are changed, i.e., when the owner of the second information image is changed (its ownership is transferred), the information image managing server reflects the change in the information image managing table. Based on a request from the first client (an information image provider), the information image managing server extracts the identifier of the second client, which owns the second information image that represents the first client based on the information image managing table, and sends the extracted identifier to the first client.

When an instruction to change attribute information contained in the second information image or to delete the second information image is received from the first client (the information image provider), the information image managing server updates the information image managing table based on the instruction, and the folder managing server updates the folder managing table based on the updated information image managing table.

The "network" is arranged to allow information data formatted according to a predetermined protocol to flow bidirectionally, as represented by the Internet. The network may be either wireless or wired.

The "information image" includes, as a unit to be handled, image information, related information for an operator to bring about a certain operation based on the image information, etc., and is arranged such that it can be transmitted or otherwise handled on a network as a single unit. The information image is divided into "master information image" and "copy information image". The "first information image" corresponds to the "master information image", and the "second information image" corresponds to the "copy information image". The information image may be composed of electronic data described by a markup language, such as XML (EXTENSIBLE MARKUP LANGUAGE) data or the like.

The "master information image" is an information image that is managed by an information image provider, and its contents are changed by the information image provider. The master information image has specific information (a master ID, a provider user ID, a version, a type, etc.) with which to specify the master information image.

The "copy information image" is generated based on the master information image. As with the master information image, the copy information image has specific information (a serial ID, a version, a type, a master ID, a master location, a provider user ID, etc.) with which to specify the copy information image. The copy information image is generated based on the master information image, with attribute information, etc. added thereto. When a copy information image is owned by the operator of a client, attribute information, etc. thereof is set for each client. Therefore, even though copy information images are generated based on the same master information image, it is possible to have their functions different from client to client.

The "image information" is information that can be specified based on image specific information such as a fine name or identifying information that is embedded therein. The image information acts as being displayed as an image on an information display apparatus, which is a client. More specifically, the image information includes an image data stream in any of various formats including GIF, JPG, PCX, etc.

The "related information" is information serving as a basis for the operator of a terminal to perform a "predetermined action" based on an information image. Specifically, the related information is information related to an information image or image information.

The "specific information" is information for specifying an information image. With respect to a master information image, its specific information represents a master ID, a provider user ID, a version, an information image type, etc. that are unique to the information image utilizing system. With respect to a copy information image, its specific information represents a serial ID, a version, an information image type, a master ID as a generating source, the location of the master information image (master location), a provider user ID, etc. that are unique to the information image utilizing system.

With respect to a user information image to be described later on, its specific information may include a name, an IP (Internet Protocol) address, an electronic mail address, etc.

The "attribute information" serves to define how to handle information relative to a copy information image. When a copy information image is owned by the operator of a client, attribute information, etc. thereof is set for each client. Attribute information may be set for each predetermined action. The provider of the information image can change attribute information subsequently. Attribute information represents plural holdability, off-lining ability, possessibility, assignability, introducibility (sendability), a period of validity, possession management, a signature, a certificate, etc.

The "client" is referred to as an information terminal apparatus, an information display apparatus, or simply a terminal. The client includes a personal computer, a portable information terminal, a cellular phone, and an electric appliance having an information terminal function. The client incorporates at least an information image processing means and has a function to be able to display and manipulate an information image.

An information image can play various roles in communications and sending and receiving of information by providing various utilization items (predetermined actions) in related information contained in the user information image. In particular, an information image containing specific information, which includes the identifier (the user ID) of a client, and mediating to send and receive information between clients is referred to as a "user information image".

Utilizability (corresponding to an access right) can be established for each utilization item (predetermined action) determined in related information in attribute information contained in an information image. The utilizability can be established for each owner of an information image.

The "predetermined action" may be, for example, an electronic mail process, a chat process, an electronic data sending and receiving process, a user information displaying process, a process of updating an information image, a process of introducing (sending) an information image, and a process of assigning an information image.

The "electronic mail process" is a process of sending and receiving an electronic mail (a communication text, attached electronic data, etc.) to and from a user information image provider (a user represented by a user information image), etc.

The "chat" process is a process of sending a chat request to a user information image provider or the like or performing real-time communications between clients.

The "electronic data sending and receiving process" is a process of sending electronic data to a user information image provider or the like and receiving electronic data from the user.

The "user information displaying process" is a process of displaying information (a user ID, a name, a handle name, etc.) relative to a user information image provider or the like.

The "process of updating an information image" is a process of updating a master information image (updating a version thereof) or updating a copy information image (updating a version thereof).

The "process of introducing (sending) an information image" is a process of introducing (sending) an information image to a user information image provider or the like. A user to which an information image is introduced (sent), as well as a user from which an information image is introduced (sent), can own and utilize the information image that has been introduced (sent).

The "process of assigning an information image" is a process of assigning an information image to a user information image provider or the like. A user to which an information image is assigned can own and utilize the assigned information image. However, a user from which an information image is assigned cannot own and utilize the assigned information image.

These processes will be described later on.

A client represented by a user information image (a user information image provider) can change attribute information relative to a user information image (a copy information image) that is owned by another client (a user information image owner). If the user information image of the user information image provider is owned by an unintended user, or if the user information image provider wants to limit utilization of the user information image of its own by a certain owner, then the user information image provider can change the attribute information of the user information image owned by the owner or delete the user information image owned by the owner. Thus, the user information image provider can not only limit the utilization of the user information image in advance, but also handle a retrospective matter such as the sending of an annoying electronic mail or an annoying information image via the user information image. Stated otherwise, not only information can be sent and received between clients, but also the clients can be authenticated, through a user information image. As a result, it is possible to distribute information with high security and high personal information protection.

According to a second invention, there is provided an information image managing apparatus connected to one or plural clients through a network, for managing an information image including, as a unit to be handled, image information and related information for bringing about a predetermined action based on the image information, and the apparatus mediating to send and receive information between the clients, characterized by one or plural information image managing servers for generating and holding a first information image by including specific information including an identifier of a first client in the information image, generating and holding a second information image by including attribute information representative of an access right for each identifier of a second client as an owner and each the predetermined action, in the first information image, and holding an information image managing table, which associates an identifier of the first information image, the identifier of the first client, an identifier of the second information image, and the identifier of the second client with each other.

The second invention is an invention directed to an information image managing apparatus in the information image utilizing system according to the first invention.

According to a third invention, there is provided an information image managing method in an information image managing apparatus connected to one or plural clients through a network, for managing an information image including, as a unit to be handled, image information and related information for bringing about a predetermined action based on the image information, and the apparatus mediating to send and receive information between the clients, characterized by the information image managing step of generating and holding a first information image by including specific information including an identifier of a first client in the information image, generating and holding a second information image by including attribute information representative of an access right for each identifier of a second client as an owner and each the predetermined action, in the first information image, and holding an information image managing table, which associates an identifier of the first information image, the identifier of the first client, an identifier of the second information image, and the identifier of the second client with each other.

The third invention is an invention directed to an information image managing method in the information image managing apparatus according to the second invention.

According to a fourth invention, there is provided a user information image characterized by including, as a unit to be handled, image information, related information for bringing about a predetermined action based on the image information, specific information including an identifier of a client connected by a network, and attribute information including an access right for each the predetermined action and each owner, and the user information image mediating to send and receive information between clients.

The fourth invention is an invention directed to a user information image in the first through third inventions.

According to a fifth invention, there is provided a program for enabling a computer to function as an information image managing apparatus according to the first invention.

According to a sixth invention, there is provided a recording medium storing therein a program for enabling a computer to function as an information image managing apparatus according to the first invention.

The "recording medium" includes a CD-ROM, a DVD, a flexible disk, a hard disk, or the like.

Arrangements and features of the present invention will become apparent from an embodiment of the present invention and accompanying drawings to be described below.

BRIEF DESCRIPTION OF DRAWINGS

FIG. 3 is a diagram illustrating copy information image data 300;

FIG. 6 is a diagram showing a data arrangement of an information image based on XML data;

FIG. 9 is a diagram showing a folder managing table 901 held and managed by a folder manager 113 of a folder managing server 103;

FIG. 12 is a diagram showing a flow to introduce (send) an information image via a user information image;

FIGS. 17A and 17B are diagrams showing an information image working area that is displayed on a client before and after a process of updating a user information image.

BEST MODE FOR CARRYING OUT THE INVENTION

Figure 1:
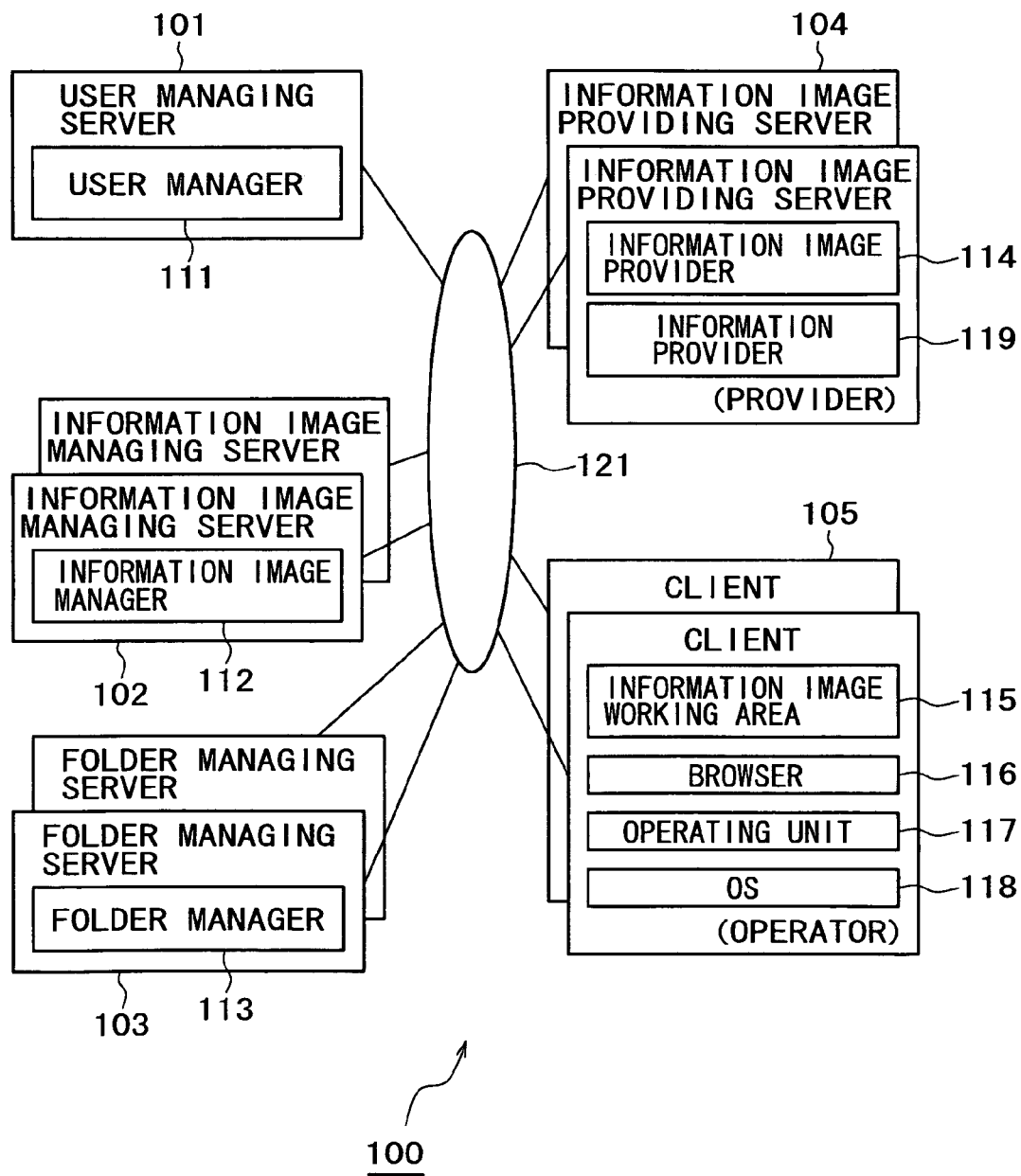
FIG. 1 is a schematic diagram of an information image utilizing system 100.

A preferred embodiment of an information image utilizing system according to the present invention will be described in detail below with reference to the accompanying drawings. In the following description and the accompanying drawings, components having substantially identical functions and arrangements are denoted by identical reference characters and will not be described repeatedly.

(1. System Arrangement of an Information Image Utilizing System)

A system arrangement of an information image utilizing system according to the present embodiment will be described below with reference to FIG. 1. FIG. 1 is a schematic diagram of an information image utilizing system 100. As shown in FIG. 1, the information image utilizing system 100 includes a user managing server 101, an information image managing server 102, a folder managing server 103, an information image providing server 104, and a client 105 all connected by a network 121 such as the Internet that is capable of bidirectional communications. The client 105 incorporates an information image processing apparatus according to the present embodiment and capable of displaying an information image working area 115 and a browser 116. The client 105 also incorporates a working unit 117 and an OS 118.

Information that is exchanged through the network 121 mainly includes information images, various items of information induced through information images, an information image processing apparatus (information image utilizing support program, etc.) for allowing the client to utilize information images, attribute information attached to information images, and manipulated information of information images in the client. These types of information will be described in detail later on.

The user managing server 101 includes an information processing apparatus such as a computer and serves to authenticate users who use the information image utilizing system. The user managing server 101 has a user manager 111. The user manager 111 holds and manages information about users. In a certain embodiment, the user managing server 101 has a function to managing manipulated information of information images and performs a predetermined charging process in cooperation with the information image managing server 102 and the folder managing server 103.

The "user" is generally a user of information image utilizing system 100. For an easier understanding, the user will be described as including an information image provider ("provider") of the information image providing server 104 and an operator ("operator") of the client 105. However, as described later on, information image providing server and the client can be arranged so a to be able to function as a unitary entity. Specifically, one apparatus (a computer, a portable information terminal, a cellular phone, any of various devices, an electric appliance, or the like) can function as an information image providing server or operate as a client. Therefore, though users may be described separately as an operator and a provider for an easier understanding, a single user may actually be of necessity both an operator and a provider.

The information image managing server 102 is a server apparatus such as a computer connected to a terminal through a network and has a function to manage manipulated information of an information image at each client. Furthermore, as described later on, the information image managing server 102 has a function to combine image information, specific information (a master ID, a provider user ID, a version, a type, etc.), and related information for an operator to bring about a certain operation based on the image information, into a master information image as a unit to be handled.

Moreover, when a copy information image is generated based on a master information image, the information image managing server 102 also incorporates attribute information or the like relative to the copy information image. The information image managing server 102 has an information image manager 112 for holding and managing information relative to the master information image (master information image data) and information relative to the copy information image (copy information image data). The attribute information relative to the copy information image is input into information image manager 112 by the provider.

In a certain embodiment, the information image managing server 102 has a function to provide an information image support program as an information image processing apparatus in response to a request from a client. The information image managing server 102 also has a function to manage information regarding users. The function has been transmitted from a client as compensation for an information image processing apparatus that has been provided.

The folder managing server 103 has a folder manager 113 for managing a folder, which holds information to be disclosed to each user. Specifically, the folder managing server 103 has folders dedicated to respective users. Though any information may be held and managed for each user by the folder manager 113, information images owned by users are held and managed by the folder manager 113 in the present embodiment.

The information image providing server 104 includes an information processing apparatus such as a computer and is constructed as an information image disclosing server that is arranged to allow registered information images to be browsed. The information image providing server 104 operates to provide an information image, information relative to the information image, and other information to the client 105, which has accessed the information image providing server 104 through the network 121.

An information image is provided by an information image provider 114, and information (contents or the like) relative to the information image is provided by an information provider 119. An information image is provided through the information image managing server 102. Since the information image managing server 102 can be decentralized, the information image providing server 104 and the information image managing server 102 may be constructed as a unitary entity.

According to a certain embodiment, if the client 105 does not have an information image support program as an information image processing apparatus that is required to display and manipulate an information image, then the information image providing server 104 also functions as a providing server of an information image processing apparatus.

The client 105 is a so-called information terminal apparatus and has a function to be able to incorporate at least an information image processing means for displaying and manipulating an information image. More specifically, the client includes a personal computer, a portable information terminal, a cellular phone, a home electric appliance having an information terminal function, or the like, for example.

The client 105 displays an information image working area 115 and a browser 116. The operator of the client manipulates an information image that the operator owns. The information image is displayed in the information image working area 115. Thereby, the client 105 displays information relative to the information image on the browser 116 and activates and executes an application relative to the information image. For example, if the information image is concerned with a music artist, then when the predetermined operation with respect to the information image is manipulated, the client downloads music data relative to the information image from the information provider of the information image providing server and activates a performing program to perform music.

In the illustrated example, the user managing server 101, the information image managing server 102, the folder managing server 103, the information image providing server 104, and the client 105 are constructed as separate pieces of hardware. However, depending on the arrangement of the system, they may be constructed as common hardware in a desired combination.

The information image managing server 102 and the folder managing server 103 can be decentralized. For example, the user manager 111 may hold and manage locations of the information image managing server and the folder managing server for thereby decentralizing the information image managing server and the folder managing server.

The network 121 is arranged to allow information data formatted according to a predetermined protocol to flow bidirectionally, as represented by the Internet. In the present embodiment, the network 121 is the Internet that is open to the public. However, the network 121 may be of a closed environment such as a LAN or a WAN depending on the arrangement of the system. The network 121 may be either wireless or wired.

(2. Structure of an Information Image)

The structure of an information image that plays a central role in the information image utilizing system shown in FIG. 1 will be described in detail below.

The "information image" that is handled in the present invention includes, as a unit to be handled, image information and related information for an operator to bring about a certain operation based on the image information and the like. The information image is arranged such that it can be transmitted or otherwise handled on a network as a single unit. The "information image" is divided into "master information image" and "copy information image".

The "master information image" is an information image that is managed by an information image provider, and its contents are changed by the information image provider. The master information image is held and managed by the information image managing server 102 and is neither duplicated nor moved. The master information image has specific information (a master ID, a provider user ID, a version, a type, etc.) with which to specify the master information image.

The "copy information image" is generated based on the master information image. As with the master information image, the copy information image has specific information (a serial ID, a version, a type, a master ID, a master location, a provider user ID, etc.) with which to specify the copy information image. The copy information image is generated based on the master information image, with attribute information, etc. added thereto. When a copy information image is owned by the operator of a client, attribute information, etc. thereof is set for each client. Therefore, even though copy information images are generated based on the same master information image, it is possible to have their functions different from client to client.

As described above, an information image is characterized in that (1) it is made up of image information, related information, specific information, attribute information, etc., and (2) image information, related information, specific information, attribute information, etc. can be processed as a unit to be handled.

(2.1. Image Information)

The "image information" is information that can be specified based on image specific information such as a fine name or identifying information that is embedded therein. The image information acts as being displayed as an image on an information display apparatus, which is a client. More specifically, the image information includes an image data stream in any of various formats including GIF, JPG, PCX, etc.

(2.2. Related Information)

The "related information" is information serving as a basis for the operator of a terminal to perform a certain operation based on an information image. Specifically, the related information is information related to an information image or image information. If the operator of a terminal wants to refer to information that is present on a certain server, then the related information corresponds to information that specifies that information (an IP (Internet Protocol) address, an URL (Uniform Resource Locator) address, etc.). If a certain program is to be run, then the related information may be its program name or the program itself. For example, the related information may be instructive information for acquiring new image information from a server.

(2.3. Specific Information)

The "specific information" is information for specifying an information image. With respect to a master information image, its specific information represents a master ID, a provider user ID, a version, an information image type, etc. that are unique to the information image utilizing system. With respect to a copy information image, its specific information represents a serial ID, a version, an information image type, a master ID as a generating source, the location of the master information image (master location), a provider user ID, etc. that are unique to the information image utilizing system. By comparing the version of the copy information image with the version of the master information image, it is possible to determine whether the version of the copy information image is the latest or not.

With respect to a user information image to be described later on, its specific information may include a name, an IP (Internet Protocol) address, an electronic mail address, etc.

(2.4. Attribute Information)

The "attribute information" serves to define how to handle information relative to a copy information image. When a copy information image is owned by the operator of a client, attribute information, etc. thereof is set for each client or default attribute information, etc. thereof is set for each client. The provider of the information image can change attribute information subsequently. Attribute information represents plural holdability, off-lining ability, possessibility, assignability, introducibility (sendability), a period of validity, possession management, a signature, a certificate, etc.

The "plural holdability" indicates whether a plurality of copy information images can be present in a folder on the folder managing server of the same user, or not.

The "off-lining ability" indicates whether a copy information image can be off-lined (exported), or not.

The "possessibility" indicates whether a copy information image can be owned, i.e., a copy information image can be registered in a folder on a folder managing server, or not.

The "assignability" indicates whether a copy information image can be assigned, i.e., a copy information image can be moved between folders on a folder managing server (registrations thereof can be changed between folders), or not.

The introducibility (sendability) indicates whether a copy information image can be introduced (sent) to another user, i.e., a copy information image can be registered in a folder of another user on a folder managing server, or not.

The "period of validity" represents a period of validity of a copy information image in the information image utilizing system. When the period of validity elapses, the copy information image is automatically deleted. It is possible to prescribe that, after elapse of the period of validity, the information image cannot be manipulated or a report of a manipulated log of the information image to the managing server is invalidated, or after elapse of the period of validity, the information image can be manipulated in a certain manner for the first time.

The "possession management" indicates whether when a copy information image is owned or deleted, the user ID relative to the ownership of the copy information image can be indicated to the information image managing server or not.

The "signature, certificate" is used in authentication or the like.

In order to allow the image information, the related information, the specific information, the attribute information, etc. that are constructed as described above to be handled as a single unit, related information and other information can be embedded in particular image information by a process described below according to the present embodiment.

(2.5. Arrangement of an Information Image Containing Information)

An arrangement of an information image containing related information, specific information, attribute information, etc. will be described below with reference to FIGS. 2 through 5. Information contained in an information image may represent identifiers for specifying related information, specific information, attribute information, etc.

(2.5.1. Format of a Master Information Image—1)

Figure 2:
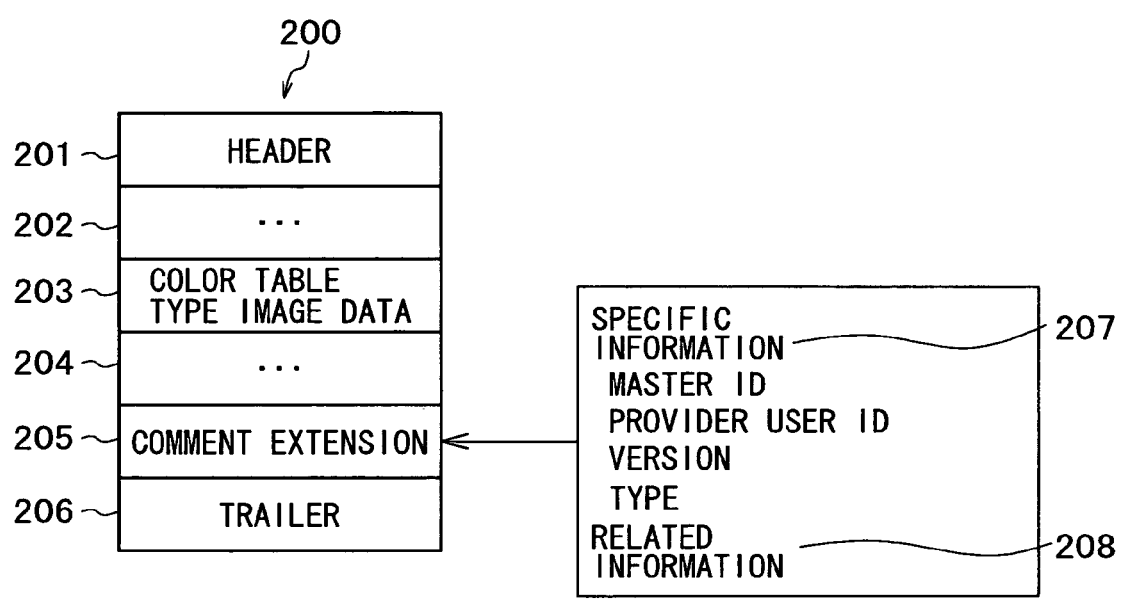
FIG. 2 is a diagram illustrating master information image data 200.

FIG. 2 shows by way of example master information image data 200 in a format of a master information image with related information and specific information embedded therein.

In FIG. 2, image information represents an image in a GIF format. However, the format of image data may be JPG or PCX rather than GIF.

A header 201 is a field provided for identifying the present information as image information in a GIF format. A letter string "GIF" and its version are assigned to the header 201.

Color table type image data 203 represent image data whose pixels are arranged from the left to the right and from the top to the bottom. According to GIF, the image data are encoded according to an LZW algorithm of a variable length code.

A comment extension 205 contains text information, which does not constitute graphic information in the GIF data stream. The comment extension 205 may include all information about graphics, the names of persons involved in the production, comments on the explanation of contents, or other control information and information not representing graphic data.

A trailer 206 indicates the end of the data stream starting from the header 201 and means that no other parameter information will follow the trailer 206.

An area 202 between the header 201 and the color table type image data 203 and an area 204 between the color table type image data 203 and the comment extension 205 may contain information other than the above information. For example, information containing parameters for defining regions of a display apparatus that are required for an image to be plotted, such as an image width, an image height, a color resolution, etc., may be assigned to these areas 202, 204.

Specific information 207 (a master ID, a provider user ID, a version, a type, etc.) and related information 208 are placed in the comment extension 205 as they are or after they are encrypted, so that all the image data are put together as a single unit of image information. As a result, the image information as a data stream contains therein related information and identifiers.

The image data have been described above according to the GIF format. However, the image data may be in another format as long as related information and specific information are recorded in areas separate from the image information.

(2.5.2. Format of a Copy Information Image—1)

FIG. 3 shows by way of example copy information image data 300 in a format of a copy information image with related information, specific information, and attribute information embedded therein.

The format of a copy information image is the same as the format of the above master information image. However, format of a copy information image includes attribute information 309 (plural holdability, off-lining ability, possessibility, assignability, introducibility, a period of validity, possession management, a signature, a certificate, etc.), which is placed, together with specific information 307 (a serial ID, a version, a type, a master ID, a master location, a provider user ID, etc.) and related information 308, in a comment extension 305.

(2.5.3. Format of a Master Information Image—2)

Another type of embedding in image information will be described below with reference to FIG. 4.

Figure 4:
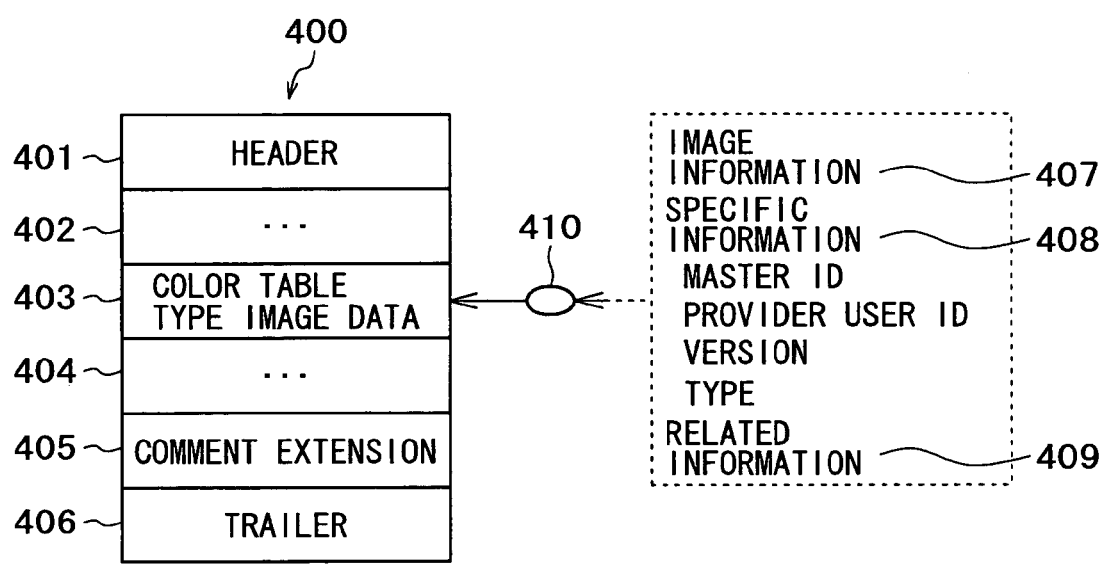
FIG. 4 is a diagram illustrating master information image data 400.

FIG. 4 shows master information image data 400 in another format of a master information image with related information embedded therein.

In FIG. 4, image information also represents an image in a GIF format. However, the format of image data may be JPG or PCX rather than GIF.

A header 401 is a field provided for identifying the present information as image information in a GIF format. A letter string "GIF" and its version are assigned to the header 401.

Color table type image data 403 are supposed to represent image data whose pixels are arranged from the left to the right and from the top to the bottom. In FIG. 4, image information 407, specific information 408 (a master ID, a provider user ID, a version, and a type), and related information 409 are mixed together in the form of a watermark, providing a mixture 410 such that the related information cannot visually be recognized and the image information can visually be recognized. The mixture 410 of information is encoded according to an LZW algorithm of a variable length code.

A comment extension 405 contains text information, which does not constitute graphic information in the GIF data stream. In this example, the comment extension 405 is a field that is not necessary in particular. If necessary, however, the information provider may use the comment extension 405 according to a free definition.

A trailer 406 indicates the end of the data stream and means that no other parameter information will follow the trailer 406.

The image data have been described above according to the GIF format. However, the image data may be in another format as long as related information and specific information are recorded in areas separate from the image information.

(2.5.4. Format of a Copy Information Image—2)

Figure 5:
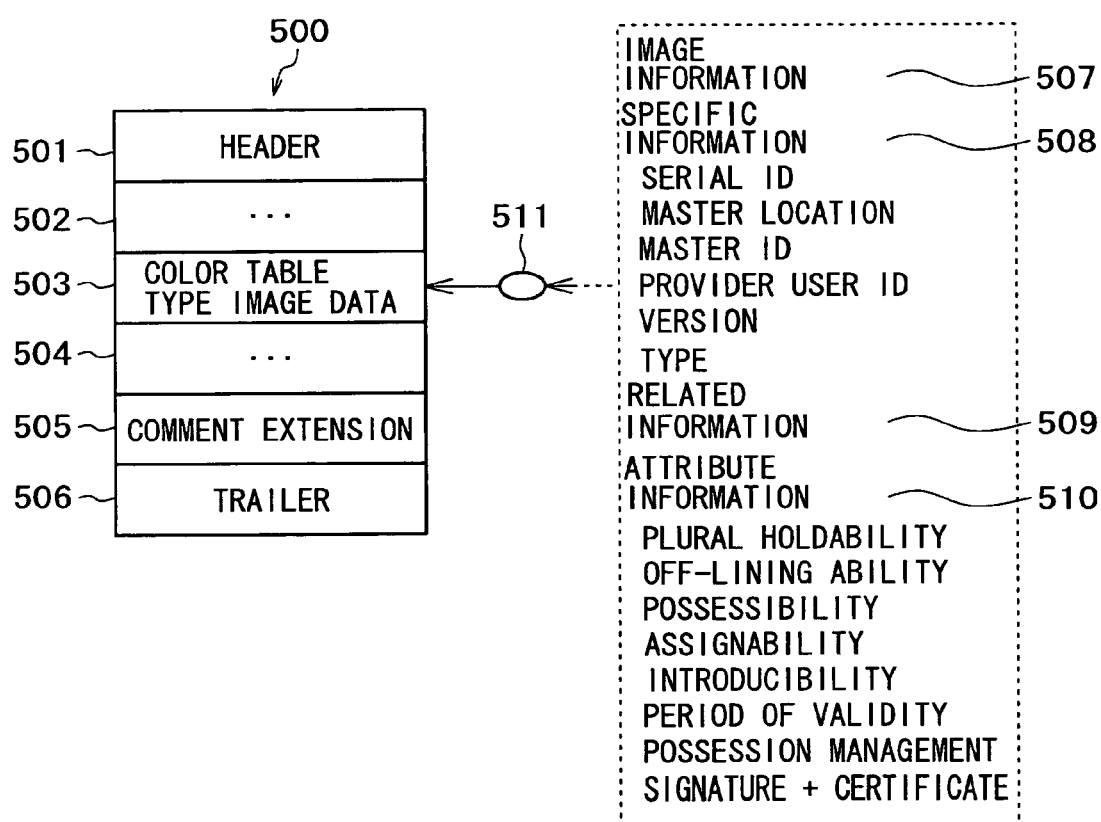
FIG. 5 is a diagram illustrating copy information image data 500.

FIG. 5 shows by way of example copy information image data 500 in a format of a copy information image with related information, specific information, and attribute information embedded therein.

The format of a copy information image shown in FIG. 5 is the same as the format of the master information image shown in FIG. 4. However, format of the copy information image includes attribute information. Color table type image data 503 are supposed to represent image data whose pixels are arranged from the left to the right and from the top to the bottom. With the copy information image, image information 507, specific information 508 (a serial ID, a version, a type, a master ID, a master location, a provider user ID, etc.), related information 509, and attribute information 510 (plural holdability, off-lining ability, possessibility, assignability, introducibility, a period of validity, possession management, a signature, a certificate) are mixed together in the form of a watermark, providing a mixture 511 such that the related information cannot visually be recognized and the image information can visually be recognized. The mixture 511 of information is encoded according to an LZW algorithm of a variable length code.

(2.6. Data Arrangement of an Information Image Including XML Data)

The information image data shown in FIGS. 2 through 5 can be represented by XML (EXTENSIBLE MARKUP LANGUAGE) data. The XML is a markup language, which allows tags to be defined uniquely. An information image can be represented by XML data with tags containing embedded data of specific information, related information, attribute information, and image information.

FIG. 6 shows by way of example a data arrangement of an information image including XML data.

In FIG. 6, descriptions 601 through 603 are related to specific information of a copy information image. The description 601 represents a serial ID, the description 602 a version, and the description 603 a type.

Descriptions 604 through 606 are related to attribute information of the copy information image. The description 604 represents possessibility, the description 605 off-lining ability, and the description 606 the introducibility (sendability).

Descriptions 607, 608 are related to related information of the copy information image. The description 607 represents a link destination of a home page and allows access to the home page. The description 608 represents a destination where music contents can be acquired and allows the music contents to be reproduced.

(3. Database Managed by a Server)

(3.1. Database Managed by the User Managing Server 101)

Figures 7, 8:
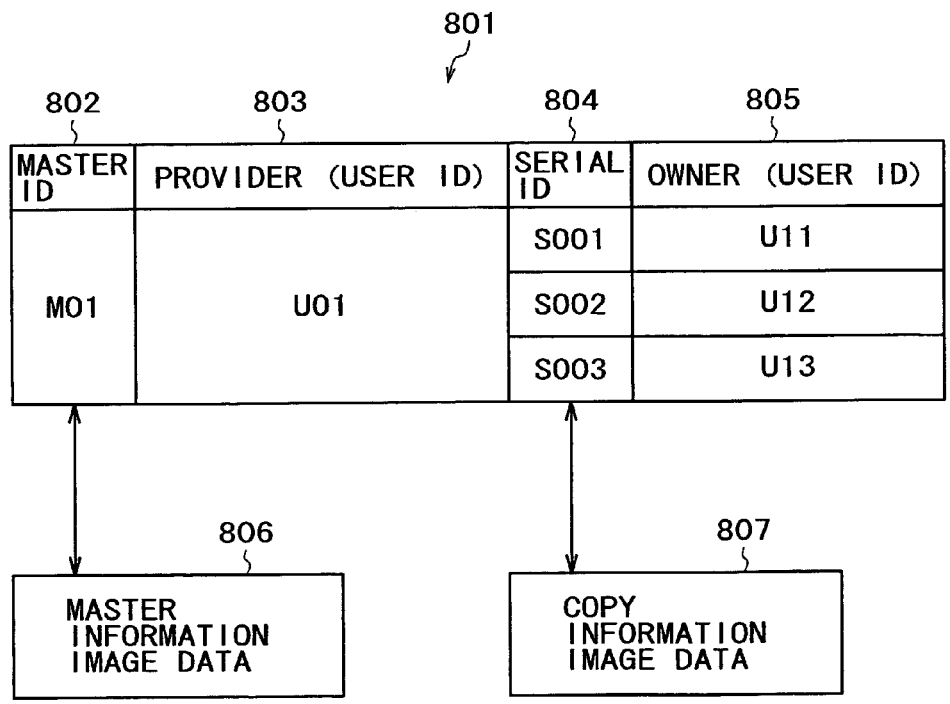
FIG. 7 is a diagram showing an arrangement of a user managing table 701 held and managed by a user manager 111 of a user managing server 101.
FIG. 8 is a diagram showing an information image managing table 801 held and managed by an information image manager 112 of an information image managing server 102.

FIG. 7 shows by way of example an arrangement of a database, which is held and managed by the user manager 111 of the user managing server 101. The user manager 111 holds and manages information about users as a database. The database is not limited to the illustrated arrangement, but may be of any arrangement insofar as it can authenticate users.

In the example shown in FIG. 7, the user manager 111 holds a user managing table 701. By referring to the user managing table 701, it is possible to authenticate a user who is accessing the information image utilizing system.

The user managing table 701 has a user ID 702, a password 703, a user attribute 704, a folder managing server location 705, and an information image managing server location 706. The user ID 702 represents a code train made up of symbols, numerals, letters, etc. for specifying users that use the information image utilizing system. The password 703 represents a code train made up of symbols, numerals, letters, etc. used to authenticate users. The user attribute 704 represents attributes of users, e.g., names, addresses, user types (general members, special members, etc.), etc.

The folder managing server location 705 represents the location (positional information on the network, an IP [Internet Protocol] address, a URL [Uniform Resource Locator], etc.) of a folder managing server, which has a folder managing table (folder) corresponding to the user ID 702. The information image managing server location 706 represents the location of an information image managing server corresponding to the user ID 702.

The folder managing server location 705 is mainly referred to when a user uses the information image utilizing system as the operator of the client 105. The information image managing server location 706 is mainly referred to when a user uses the information image utilizing system as the provider of the information image providing server 104.

(3.2. Database Managed by the Information Image Managing Server 102)

The information image managing server 102 holds and manages the master information image data and the copy information image data, which have been described above with reference to FIGS. 2 through 5, and manages the master information image and its provider in association with each other, and manages the copy information image and its provider in association with each other.

FIG. 8 shows an information image managing table 801, which is held and managed by the information image manager 112 of the information image managing server 102. The database of the information image managing table 801 is not limited to the illustrated arrangement, but may be of any arrangement insofar as it associates information image data, information image providers, and information image owners with each other.

The information image managing table 801 holds and manages a master ID 802, a provider 803, a serial ID 804, and an owner 805 in association with each other. The master ID 802 represents a code train made up of numerals, letters, symbols, etc. for specifying a master information image. The provider 803 represents the user ID of the provider of the master information image. The serial ID 804 represents a code train made up of numerals, letters, symbols, etc. for specifying a copy information image. The owner 805 represents the user ID of the owner of the copy information image. The "owner" refers to a user who has registered the copy information image in its own folder on the folder managing server 103.

The master ID 802 and a master ID of specific information that is contained in the master information image data 806 are related to each other. The serial ID 804 and a serial ID of specific information that is contained in the copy information image data 807 are related to each other. The master information image data 806 correspond to the master information image data 200 and the master information image data 400 shown in FIGS. 2 and 4. Copy information image data 807 correspond to the copy information image data 300 and the copy information image data 500 shown in FIGS. 3 and 5.

Based on instructions from the information image providing server 104, the information image managing server 102 can change the contents of master information image data in the information image providing server 104, generate copy information image data by adding attribute information, grasp the owner of the copy information image data, and change the attribute information of the copy information image data for each owner.

(3.3. Database Managed by the Folder Managing Server 103)

The folder managing server 103 has the folder manager 113. The folder manager 113 manages a folder that holds information to be disclosed for each operator. Specifically, a user (the operator of a client or the like) has its own dedicated folder on the folder managing server. The operator registers a copy information image in its own folder and thus owns the copy information image.

For owning the copy information image, it is not necessary to record the copy information image data themselves in the folder. It is sufficient to record at least the serial ID of the copy information image. When requested to provide an owned information image from the client of the operator, the folder managing server 103 requests the information image managing server 102 for copy information image data based on the serial ID recorded in the folder of the operator. Therefore, the server 103 provides the copy information image data to the client.

FIG. 9 shows a folder managing table 901 that is held and managed by the folder manager 113 of the folder managing server 103. The database of the folder managing table 901 is not limited to the illustrated arrangement, but may be of any arrangement insofar as it associates users such as operators and copy information images with each other.

The folder managing table 901 associates a user ID 902 and a master ID or serial ID 903 with each other. The user ID 902 represents the user ID of an operator or the like. The master ID or serial ID 903 records the serial ID of a copy information image owned by the user that is specified by the user ID 902. Alternatively, the master ID or serial ID 903 records the master ID of a master information image of the user. For technical and convenience reasons, attribute information of a copy information image and other information image data may also be recorded in the folder managing table 901, if necessary.

(3.4. Decentralization of Servers)

The load on the information image utilizing system can be decentralized by decentralizing the information image managing server 102 and the folder managing server 103.

For decentralizing these servers, accessing sources and accessing destinations may be recorded when the user managing server 101, the information image managing server 102, the folder managing server 103, and the information image providing server 104 access each other. Alternatively, the locations (the locations on the network, IP [Internet Protocol] addresses, and URL [Uniform Resource Locator]) of the information image providing server 102, the folder managing server 103, and the information image providing server 104, which correspond to each user, may be recorded in the user managing table 701. Further alternatively, the locations of these servers may be recorded in information images.

In this case, the information image providing server 104 and the client 105 can gain access to the corresponding information image managing server 102 and folder managing server 103. Moreover, as described above with reference to FIGS. 2 and 4, since information image data contain a provider user ID as specific information, the folder managing server 103 can access the information image managing server 102, which corresponds to the provider user ID.

(4. Summary of Operation of the Information Image Utilizing System)

Figure 10:
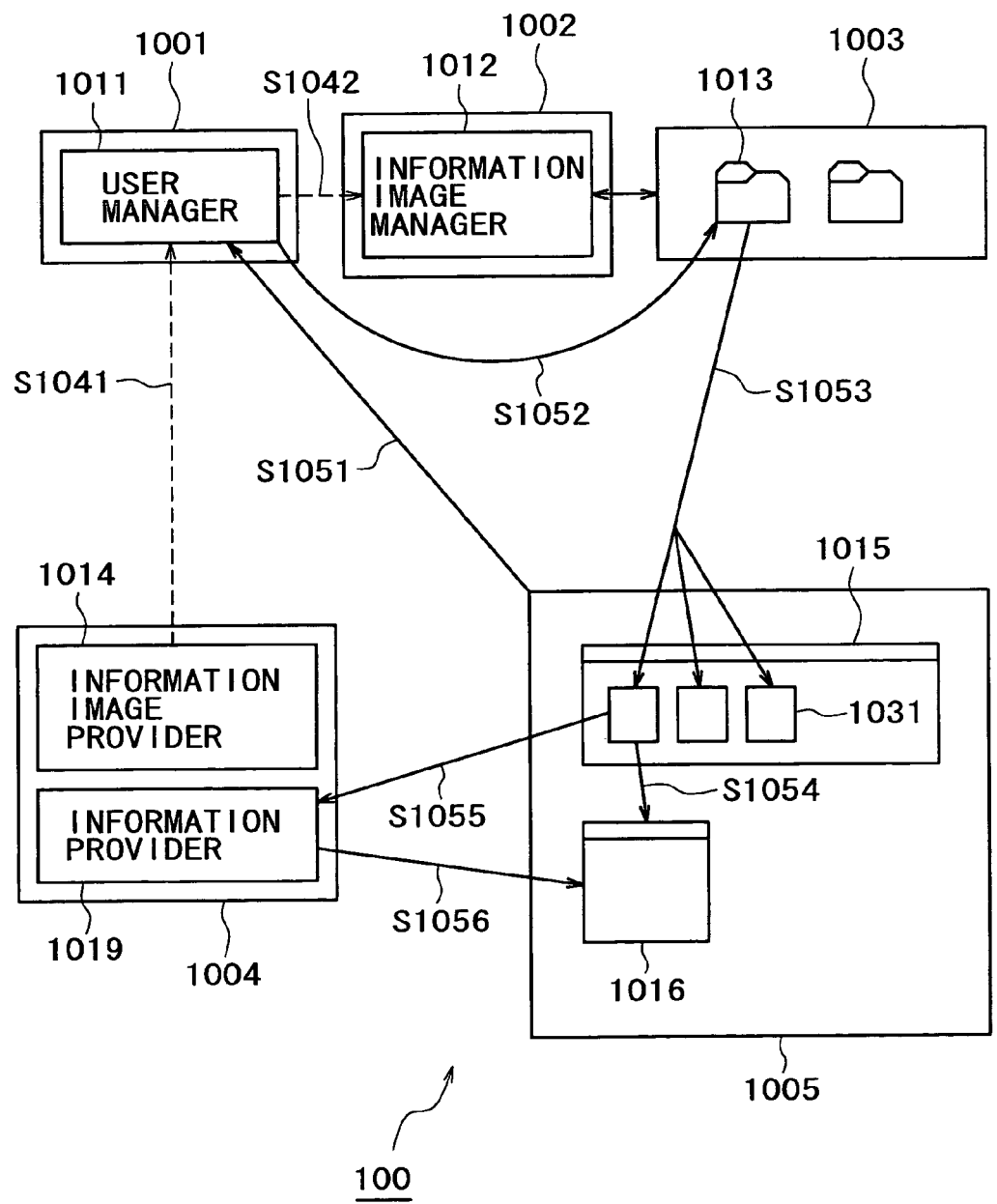
FIG. 10 is a diagram schematically showing the manner in which the information image utilizing system 100 operates.

A summary of operation of the information image utilizing system will be described below with reference to FIG. 10. FIG. 10 is a diagram schematically showing the manner in which the information image utilizing system 100 operates.

(4.1. Operation of the Information Image Utilizing System with Respect to an Information Image Providing Server)

An information image providing server 1004 accesses a user managing server 1001 and is authenticated thereby (S1041). An information image provider 1014 of the information image providing server 1004 instructs an information image managing server 1002 to register a master information image, generate a copy information image, change attribute information of a copy information image, and provide the ownership of a copy information image (S1042). An information image manager 1012 of the information image managing server 1002 registers a master information image, generates a copy information image, changes attribute information of a copy information image, and provides the ownership of a copy information image.

(4.2. Operation of the Information Image Utilizing System with Respect to a Client)

A client 1005 accesses the user managing server 1001 and is authenticated thereby (S1051). A folder managing server 103 transmits copy information image data registered in a folder 1013 of the operator of the client 1005, i.e., owned by the operator, to the client 1005 (S1053).

When the folder managing server 1003 transmits copy information image data, it may be provided with copy information image data from the information image manager 1012 of the information image managing server 1002 based on the serial ID recorded in the folder 1013. The client 1005 displays the copy information image on an information image working area 1015.

When the operator makes a certain manipulative action on the copy information image, the client 1005 displays the contents of related information contained in the copy information image on a browser 1016 (S1054). The client 1005 also requests an information provider 1019 of the information image providing server 1004 to provide information based on an acquired destination of related information, which is contained in the copy information image (S1055). Based on the request, the information provider 1019 transmits the information to the client 1005 (S1056), which displays the information on the browser 1016.

(4.3. Synchronization of the Information Image Providing Server and the Folder Managing Server)

The contents of data held by the information image manager 1012 and the contents of data held by the folder 1013 are synchronized at a predetermined timing to keep themselves matched.

(5. User Information Image)

Types of information images include ordinary information images and user information images. An ordinary information image has only a function to refer to information relative to the information image. A user information image has not only the function to refer to information, but also an authenticating function when information such as information images is sent and received, electronic mail is exchanged, and chatting is performed between operators (users) of the information image utilizing system. Operators (users) represented by user information images are not limited to individuals, but may be various corporations, various parties, various groups, and families.

(5.1. Acquisition of a User Information Image)

Operation of the information image utilizing system for registering a user and generating and acquiring a user information image will be described below.

Figure 11:
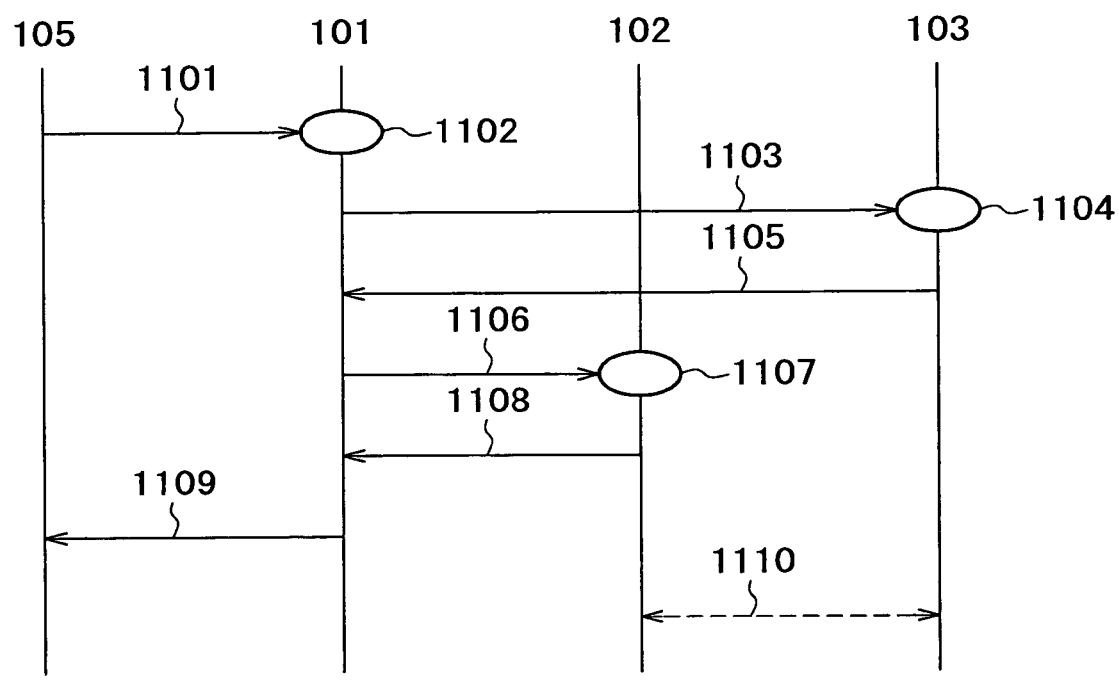
FIG. 11 is an information flow diagram showing the manner in which the information image utilizing system 100 operates to register a user and generate and acquire a user information image.

FIG. 11 is an information flow diagram representing operation of the client 105 (the operator user ID "U01"), the user managing server 101, the information image managing server 102, and the folder managing server 103 for registering a user and generating and acquiring a user information image.

The operator accesses the user managing server 101 from the client 105, inputs user registration information (user attributes (a name, an address, an electronic mail address, etc.), an indication of a folder managing server in which a folder dedicated to the operator is to be generate, an indication of an information image managing server, and other required items), and applies for a user registration (step 1101).

The user managing server 101 confirms whether the user registration information sent from the client 105 is proper or not, issues a user ID and a password to the operator, and records them together with the user registration information as a user managing table 701 in the user manager 111 (step 1102).

The user managing server 101 instructs the indicated folder managing server 103 to generate a folder corresponding to the user ID (step 1103).

The folder managing server 103 generates a folder corresponding to the user ID in the folder manager 113 (step 1104) and responds to the user managing server 101 with a message representing the completion of the generation of the folder (step 1105).

The user managing server 101 instructs the indicated information image managing server 102 to generate a user information image (step 1106).

The information image managing server 102 generates a user information image, records the generated user information image as an information image managing table 801 in the information image manager 112 (step 1107), and responds to the user managing server 101 with a message representing the completion of the processing (step 1108).

The user managing server 101 responds to the client 105 with a message representing the end of the user registration (step 1109).

The contents of data held by the information image manager 112 and the contents of data held by the folder manager 113 are synchronized at a predetermined timing to keep themselves matched (step 1110). The information image managing server 102 generates and records a master of the user information image (master information image) (step 1107). The information image managing server 102 may generate a copy of the user information image (copy information image) and register the copy information image in a corresponding folder of the operator, so that the operator can introduce (send) its own user information image to an other operator.

The user information images (master and copy) may contain the user ID of the operator indicated by the user information image as a provider user ID of specific information.

(5.2. Introduction (Sending) of a Copy Information Image Via a User Information Image)

The introduction (sending) of a copy information image via a user information image, among modes of utilization of a user information image, will be described below.

(5.2.1 Summary)

A summary of operation of the information image utilizing system for introducing (sending) a copy information image via a user information image will first be described below.

FIG. 12 is a diagram showing a flow to introduce (send) an information image owned by an operator 1 (user ID "U01") of a client 105-1 to an operator 2 (user ID "U02") of a client 105-2.

When the operator 1 with the user ID "U01" accesses the information image utilizing system, an information image working area 1201 together with information images 1202, 1203 owned by the operator 1 is displayed on the client 105-1. The information image 1203 represents a user information image of the operator 2 with the user ID "U02".

When the operator 1 drags and drops the information image 1202 to be introduced to the operator 2 onto the user information image 1203 with a mouse, the information image utilizing system refers to attribute information contained in the information image 1202. If the information image 1202 can be introduced, the system has the information image 1202 owned by the operator 2. At this time, an information image 1205 introduced (sent) by the operator 1 is newly displayed in an information image working area 1204 of the client 105-2. The image 1205 can be utilized by the operator 2.

(5.2.2. Specific Operation)

Operation of the information image utilizing system for introducing (sending) an information image owned by an operator (user ID "U01") in a folder (folder manager) via the above user information image (user ID "U02") to another operator (user ID "U02") will be described below.

Figure 13:
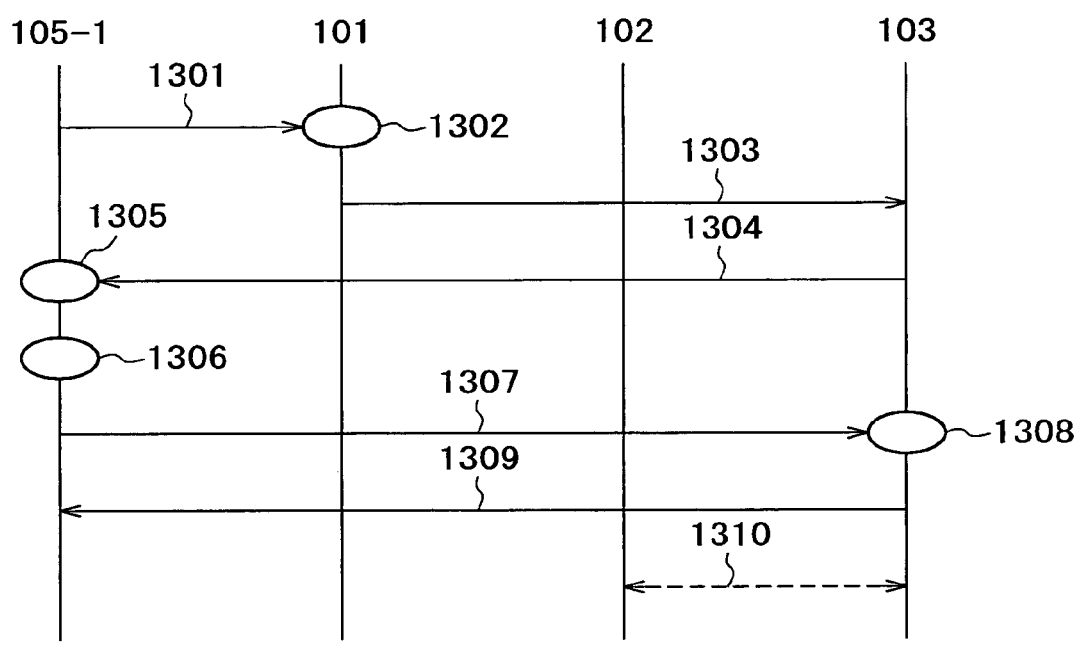
FIG. 13 is an information flow diagram showing the manner in which the information image utilizing system 100 operates to introduce (send) an information image via a user information image.

FIG. 13 is an information flow diagram representing operation of the client 105-1 (the operator user ID "U01"), the user managing server 101, the information image managing server 102, and the folder managing server 103 for introducing (sending) an information image via a user information image.

The client 105-1 inputs the user ID and password of the operator 1 to access the user managing server 101 (step 1301).

The user managing server 101 refers to the user managing table 701, authenticates the operator 1 of the client 105-1 based on the user ID and password that have been input (step 1302), and instructs the folder managing server 103, which corresponds to the user ID, to transmit copy information image data owned by the operator to the client 105-1 (step 1303).

The folder managing server 103 transmits the copy information image data owned by the operator to the client 105-1 (step 1304). If necessary, at this time, data relative to the copy information image may be acquired from the information image managing server 102 based on a serial ID or the like that is held by the folder managing server 103.

The client 105-1 displays the copy information image owned by the operator 1 in the information image working area 115 (step 1305) (see the information image working area 1201 of FIG. 12).

When the operator 1 performs a predetermined action, e.g., a drag-and-drop action with an input device such as a mouse, on the copy information image 1202 that the operator 1 desires to be introduced (sent), with respect to the user information image 1203 relative to the user (operator 2) as a destination (see the information image working area 1201 of FIG. 12), the client 105-1 refers to attribute information of the copy information image 1202 to be introduced (sent) and confirms whether the copy information image 1202 is an information image that can be introduced (sent) or not (step 1306).

If the copy information image 1202 is an information image that can be introduced (sent), then the client 105-1 instructs the folder managing server 103 to register the copy information image in the folder of the operator 2 (step 1307). The folder managing server 103 registers the copy information image in the folder of the operator 2, records the copy information image in the folder managing table 901 (step 1308), and responds to the client 105-1 (step 1309).

The contents of data (the information image managing table 801) held by the information image manager 112 and the contents of data (the folder managing table 901) held by the folder manager 113 are synchronized at a predetermined timing to keep themselves matched (step 1310).

The client 105-2 (the operator 2) displays the copy information image owned by the operator 2 in the information image working area 1204 according to the same process as steps 1301 through 1305 (see FIG. 12). When the above sending (introducing) process is carried out, the sent (introduced) copy information image 1205 is displayed in the information image working area 1204 (see FIG. 12) and can be utilized by the operator 2.

Unlike the copy information image owned by the operator 1, the copy information image registered in the folder of the operator 2 has its attribute information including a certain right (access right) made invalid. Alternatively, default attribute information set by the information image provider may be added to the copy information image registered in the folder of the operator 2. Specifically, even if a right (access right) is required in utilizing particular information (contents or the like) relative to the copy information image, the right may not be sent (introduced). Therefore, even if the copy information image owned by the operator 1 has a right (access right) with respect to the utilization of particular information as attribute information, the operator 2 is unable to utilize the particular information (contents or the like) unless the operator 2 obtains the right (access right) with respect to the utilization of the particular information (contents or the like). The same holds true when the copy information image is off-lined and introduced (sent) using a recording medium, rather than the network.

For example, the operator 1 acquires a copy information image relative to a trial version of software X (a copy information image having attribute information representing that only a trial version is available), and attribute information representing that a product version of the software X is available is added to the copy information image upon completion of the purchasing process. Thereafter, even when the operator 1 introduces (sends) the information image to the operator 2, the attribute information representing that a product version of the software X is available is not introduced (sent) (not taken over). The operator 2 cannot use a product version of the software X from the copy information image unless the operator 2 carries out a new purchasing process and receives attribute information representing that a product version of the software X is available.

In step 1310, the information image managing server 102 can hold ownership information with respect to the copy information image that has been introduced (sent), assigned, deleted, etc. Consequently, as when an ordinary information image is introduced (sent), when a user information image is introduced (sent) or assigned, the operator (the user information image provider) can grasp the owner of the user information image of its own. If the user information image of the operator (the user information image provider) is owned by an unintended user, or if the operator (the user information image provider) wants to limit utilization of the user information image of its own by a certain owner, then the operator can access the information image managing server 102 and change the attribute information of the user information image of its own, which corresponds to the owner, or delete the user information image of its own, which corresponds to the owner.

A copy information image can be assigned in the same manner as it is introduced (sent) as described above. When a copy information image is introduced (sent), the operator who introduces (sends) the copy information image continuously owns the copy information image, which has been introduced (sent). However, when a copy information image is assigned, it is no longer owned by the operator who introduces (sends) the copy information image. In this case, the registration of the copy information image is canceled from the folder of the operator who introduces (sends) the copy information image in steps 1307, 1308, for example.

When a copy information image is introduced (sent) as described above, the client 105-1 may include the user ID of the operator 1 in the provider user ID of the specific information of the copy information image that is introduced (sent), so that the user ID of the operator 1 can be displayed on the client 105-2 of the operator 2. Furthermore, a process relative to an electronic mail process may be included as related information in the user information image, so that an electronic mail can be attached when the copy information image is introduced (sent). The operator 2 may thus be aware of which operator has introduced (sent) the copy information image.

When the client 105-1 introduces (sends) the user information image of the operator 1 to the folder (folder manager) corresponding to the operator 2, the client 105-1 may include information as to a public key in attribute information of the user information image, which is introduced (sent), so that the user information image will be present only in the folder of the operator 2 (the user information image cannot be introduced (sent) or assigned from the operator 2).

Other than a public key, information as to authentication using a public key encryption process, e.g., a digital certificate (digital signature), or information as to a third party organization (certificate authority), which holds public keys, may be included in attribute information of the information image. In this manner, the information image is prevented from being falsified or wiretapped when it is introduced (sent) or assigned.

(5.4. Other Modes of Utilization of a User Information Image)

Other modes of utilization of a user information image will be described below with reference to FIG. 14. A user information image can play various roles in communications and sending and receiving of information by providing various utilization items (predetermined actions) in related information contained in the user information image. Processes performed on a user information image include, other than sending (introducing) the user information image and assigning the user information image, as described above, various processes such as sending and receiving electronic mails, chatting (chat requests), etc. between operators that are represented by the user information image.

(5.4.1. Operation of the Information Image Utilizing System with Respect to Sending an Electronic Mail)

Of the modes of utilization of a user information image, operation of the information image utilizing system with respect to sending an electronic mail via a user information image will be described below.

Figure 14:
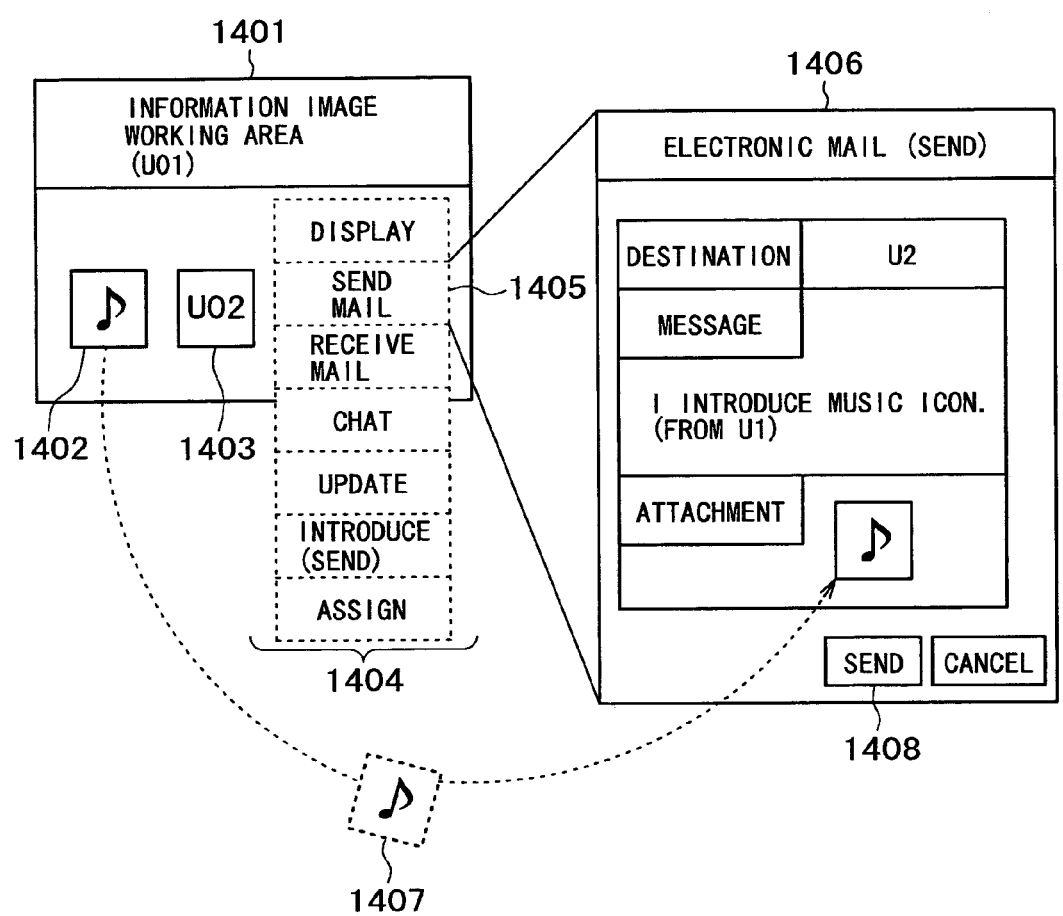
FIG. 14 is a diagram showing a flow to send an electronic mail via a user information image.

FIG. 14 is a diagram showing a flow to send an electronic mail from the operator 1 (user ID "U01") of the client 105-1 to the operator 2 (user ID "U02") of the client 105-2 via a user information image (user ID "U02").

First, as described above with reference to FIG. 13, the client 105-1 displays a copy information image owned by the operator 1 in the information image working area 1401 according to the same process as steps 1301 through 1305.

When the operator 1 makes a predetermined action (left clicking on a mouse or the like) on the user information image 1403 (user ID "U02"), the client 105-1 displays a rich menu 1404.

When the operator 1 makes a predetermined action (left clicking on a mouse or the like) on an item 1405 "SEND MAIL", the client 105-1 displays an electronic mail send window 1406. The operator 1 inputs a text to be sent in the electronic mail send window, and, if necessary, attaches a copy information image 1407 to be introduced (sent) with a drag-and-drop action of a mouse. When the operator 1 presses a "SEND" button 1408, the client 105-1 sends the text and the copy information image 1407 to the operator 2.

The rich menu 1404 is displayed based on related information that is contained in a user information image 1503. For example, the rich menu 1404 contains "DISPLAY" (displaying of contents of the user information image (a user ID, a name, a handle name, etc.), "SEND MAIL" (sending of an electronic mail), "RECEIVE MAIL" (receiving of an electronic mail), "CHAT" (a conversation between clients), "UPDATE" (updating the versions of an information image and a user information image), "INTRODUCE (SEND)" (introducing (sending) of an information image and a user information image), "ASSIGN" (assigning of an information image and a user information image).

The utilizability of the items of the rich menu 1404 is determined by attribute information contained in the user information image 1403. As described in detail later on, if the user information image 1403 (user ID "U02") owned by the operator 1 contains attribute information representing no chat, then "CHAT" is not displayed in the rich menu 1404 or is displayed in a transmissive color in the rich menu 1404, indicating that the operator 1 is unable to "chat" with the operator 2.

(5.5. Changing of Attribute Information of a User Information Image)

Changing of attribute information of a user information image will be described below. As described above, a user information image can play various roles in communications and sending and receiving of information by providing various utilization items (predetermined actions) in related information contained in the user information image. The utilizability (access right) can be established for each utilization item (predetermined action) determined in related information in attribute information contained in a user information image. The utilizability can be established for each owner of a user information image.

(5.5.1. Operation for Changing Attribute Information of a User Information Image)

Operation of the information image utilizing system for changing attribute information of a user information image will be described below with reference to FIGS. 15 and 16.

Figure 15:
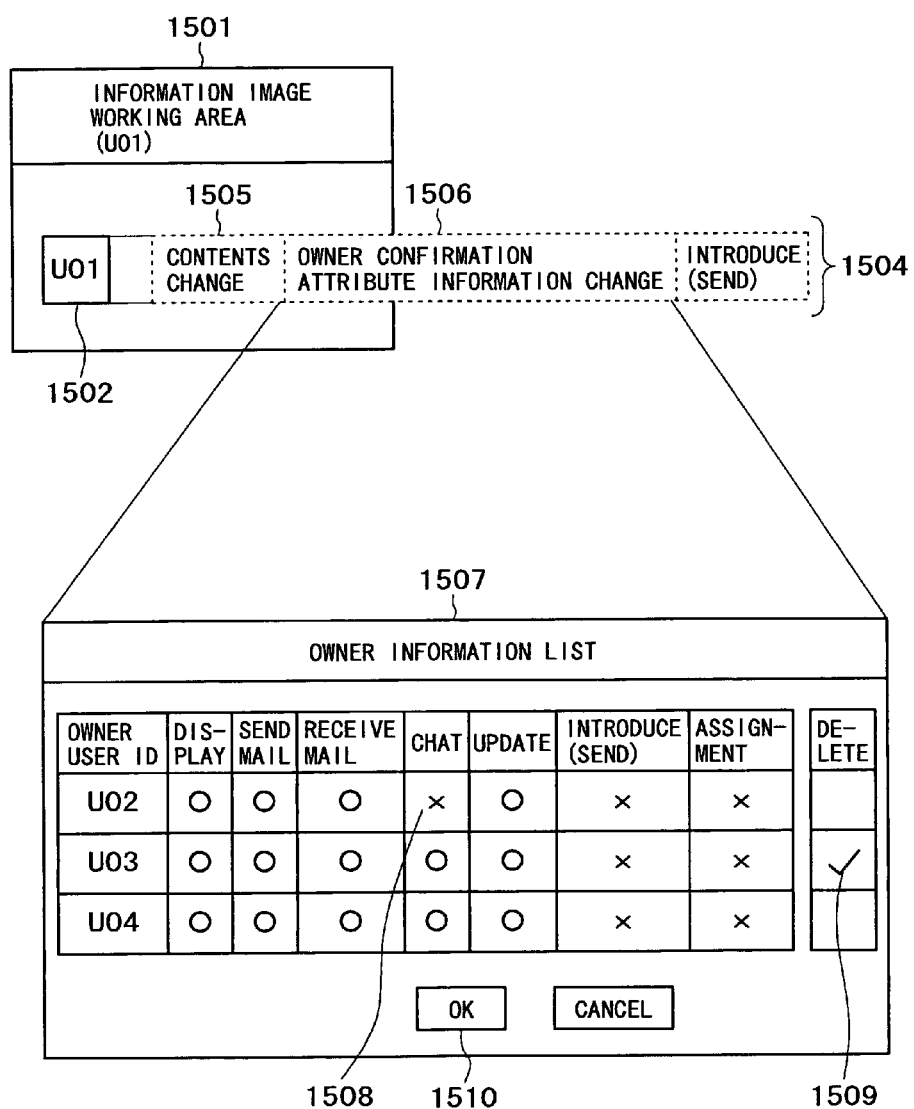
FIG. 15 is a diagram showing by way of example a displayed image of ownership information of a user information image.

FIG. 15 is a diagram showing by way of example a displayed image of owner information of a user information image on the client 105-1.

Figure 16:
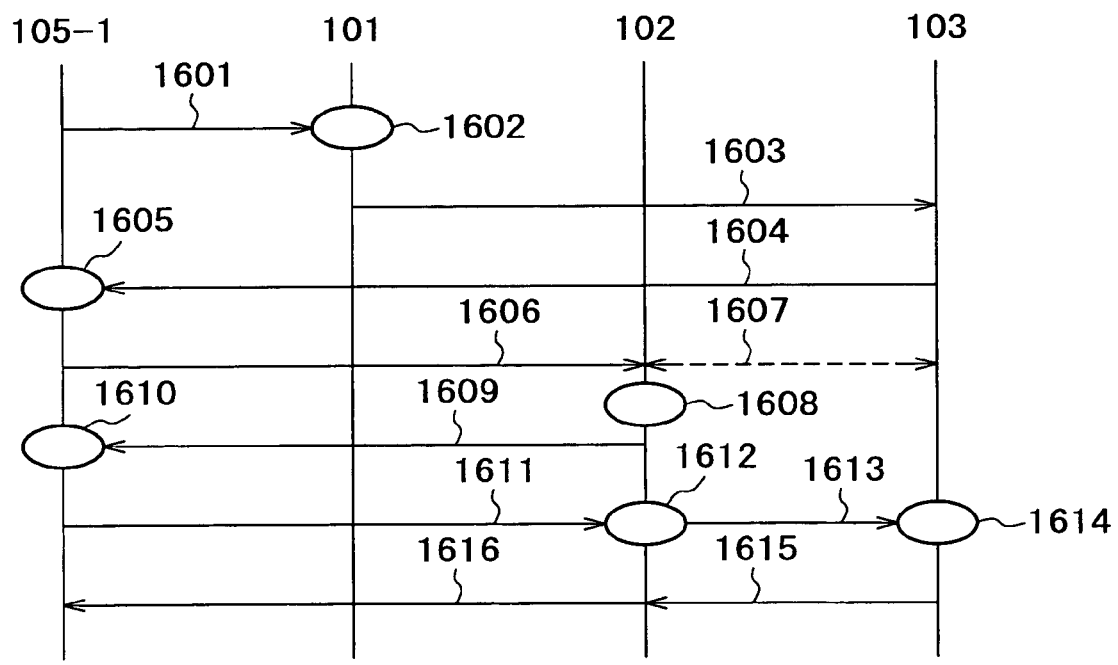
FIG. 16 is an information flow diagram showing the manner in which the information image utilizing system operates to change attribute information of a user information image.
Figures 18A, 18B:
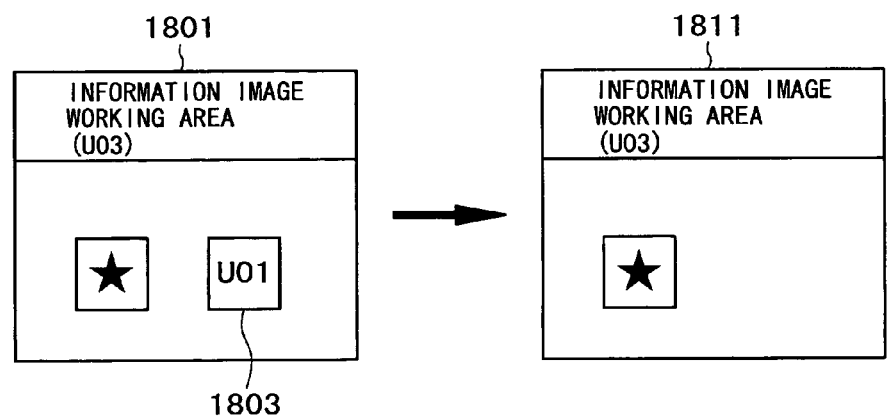
FIGS. 18A and 18B are diagrams showing an information image working area that is displayed on a client before and after a process of updating a user information image.

FIG. 16 is an information flow diagram showing the manner in which the information image utilizing system operates to change attribute information of a user information image.

A process in which the operator 1 (user ID "U01") of the client 105-1 changes attribute information, which is owned by the operator 2 (user ID "U02"), of a user information image (user ID "U01") that represents the operator 1 will be described below.

First, as described above with reference to FIG. 13, the client 105-1 displays a user information image representative of the operator 1 in an information image working area 1501 according to the same process as steps 1301 through 1305 (steps 1601 through 1605).

When the operator 1 makes a predetermined action (left clicking on a mouse or the like) on a user information image 1403 (user ID "U01") of its own, the client 105-1 displays a rich menu 1504.

The rich menu 1504 is displayed based on related information contained in the user information image 1502 of the operator 1. The rich menu 1504 displays different items from the user information image that is owned by another operator. For example, the rich menu 1504 has an item 1505 "CONTENTS CHANGE", an item 1506 "OWNER CONFIRMATION/ATTRIBUTE INFORMATION CHANGE", and an item "INTRODUCE (SEND)".

The item "CONTENTS CHANGE" is an item for changing contents (a user ID, a name, a handle name, etc.) displayed on the client of the operator, which owns the user information image of its own.

The item "OWNER CONFIRMATION/ATTRIBUTE INFORMATION CHANGE" is an item for confirming the owner of the user information image of its own and changing attribute information of the user information image.

When the operator 1 makes a predetermined action (left clicking on a mouse or the like) on the item "OWNER CONFIRMATION/ATTRIBUTE INFORMATION CHANGE", the client 105-1 requests the information image managing server 102 to provide ownership information of the user information image of its own (step 1606). If the contents of the information image managing table 801 and the contents of the folder managing table 901 are not synchronized, then the information image managing server 102 synchronizes the contents of these tables in cooperation with the folder managing server 103 (step 1607).

The information image managing server 102 extracts the users ID 805 of owners of the user information image and the attribute information of the copy information image data 807 corresponding to the owners from the information image managing table 801 (step 1608). Then, the server 102 sends the user ID 805 and the attribute information to the client 105-1 (step 1609). The client 105-1 displays an owner information list 1507 representative of the owners of the user information image and the attribute information of the copy information images, which correspond to the owners (step 1610).

The operator 1 refers to the owner information list 1507 and can change the contents thereof if necessary. For example, if "CHAT" via the user information image (user ID "U01") owned by the operator 2 (user ID "U02") is to be inhibited, then the operator 1 changes "○" to "X" in an item 1508. If the ownership of an operator 3 (user ID "U03") is to be inhibited, i.e., if the user information image (user ID "U01") itself owned by the operator 3 is to be deleted, then the operator 1 checks "DELETE" in an item 1509. When a button "OK" 1510 is pressed, the client 105-1 sends updating information (setting information, changing information, deleting information, etc.) with respect to the user information image owned by the above other owners to the information image managing server 102 (step 1611).

Based on the updating information (setting information, changing information, deleting information, etc.) sent from the client 105-1, the information image managing server 102 updates the contents of the information image managing table 801 (including the copy information image data 807) (step 1612). The information image managing server 102 sends the updated contents to the folder managing servers 103, which correspond to the owners to be updated (step 1613), and the folder managing servers 103 update the contents of the folder managing tables 901 (step 1614).

The folder managing server 103 respond to the information image managing server 102 with a message representing the end of the updating (step 1615), and the information image managing server 102 responds to the client 105-1 with a message representing the end of the updating (step 1616).

FIGS. 17A, 17B and 18A, 18B show information image working areas that are displayed on the client before and after the above process of updating a user information image.

An information image working area 1701 is displayed on the client of the operator 2 (user ID "U02") before the updating process, and an information image working area 1711 is displayed on the client of the operator 2 (user ID "U02") after the updating process.

An information image working area 1801 is displayed on the client of the operator 3 (user ID "U03") before the updating process, and an information image working area 1811 is displayed on the client of the operator 3 (user ID "U03") after the updating process.

In the information image working area 1701 displayed before the updating process as shown in FIG. 17A, an item 1705 "CHAT" of a rich menu 1704 of a user information image 1703 (user ID "U01") is available. In the information image working area 1711 displayed after the updating process as shown in FIG. 17B, an item 1715 "CHAT" of a rich menu 1714 of a user information image 1713 (user ID "U01") is not available.

In the information image working area 1801 displayed before the updating process as shown in FIG. 16, a user information image 1803 (user ID "U01") is displayed and available. In the information image working area 1811 displayed after the updating process as shown in FIG. 16, a user information image 1803 (user ID "U01") is no longer displayed and is not available.

(5.2.2. Advantages Offered by Changing Attribute Information)

As described above, an operator represented by a user information image (a user information image provider) can change attribute information of a user information image of its own (a copy information image) that an other operator has, as with a provider of an information image providing server. Therefore, if the user information image of the operator (the user information image provider) is owned by an unintended user due to duplication or for other reasons, or if the operator (the user information image provider) wants to limit utilization of the user information image of its own by a certain owner, then the operator can change the attribute information of the user information image of its own, which corresponds to the owner, or delete the user information image of its own, which corresponds to the owner. The operator can limit not only the utilization of the user information image in advance, but also handle a retrospective matter such as the sending of an annoying electronic mail or an annoying information image via a user information image. As a result, it is possible to distribute information with high security and high personal information protection.

(6. Other Modifications)

The preferred embodiment of the information image utilizing system according to the present invention has been described above with reference to the accompanying drawings. However, the present invention is not limited to the above embodiment. It is apparent that the person ordinary skilled in the art can make various changes or modifications to the embodiment within the scope of the technical idea that is disclosed herein, and such changes or modifications fall within the technical scope of the present invention.

In the information image utilizing system according to the present invention, a user represented by a user information image (user information image provider) can grasp the owner thereof, and the user information image holds various utilization items (predetermined actions) in related information contained therein. Attribute information contained in the user information image may have an access right established for each owner and each utilization item (predetermined action). Specifically, based on the access right, authentication with respect to the utilization of the user information image can be performed for each owner and each utilization item (predetermined action). As the information image managing server holds related information, attribute information, ownership information, etc., it is possible to establish a detailed access right with respect to the utilization of the user information image at any desired time.

The user managing server 101 holds the information image managing server location 706 and the folder managing server location 705 for each user in the user managing table 701. Therefore, these information image managing servers and folder managing servers do not need to be managed centrally, and a plurality of such information image managing servers and a plurality of such folder managing servers may be decentralized.

An information image is registered in a folder dedicated to each user (operator) on a folder managing server, and hence is not required to be registered in a particular client. Specifically, each user (operator) can access the information image utilizing system from any client and utilize information images owned in the folder. Illegal duplication of information images is eliminated. If a client does not have a support program with respect to the utilization of information images, such as an information image working area or the like, then such a support program may be downloaded when the client accesses the information image utilizing system.

A copy information image has a serial ID as specific information. When the information image is off-lined (duplicated on a recording medium or the like), it is assigned a serial ID from the information image managing server at the time the copy information image is registered and owned in a folder. The assigned serial ID is effective to prevent the copy information image from unauthorized utilization and to grasp the owner of the copy information image at all times when the copy information image is duplicated without the information image utilizing system.

Related information contained in a user information image may represent the presence situation (an access situation, a communication situation, location information, utilizing client information, etc.) of the user (user information image provider).

The functions of servers and clients (including information terminal apparatus) in the above embodiment may all be implemented by software. The software that is required to implement the functions can be distributed through a network or a recording medium such as a CD-ROM, a DVD-ROM, or the like in which a program is recorded.

INDUSTRIAL APPLICABILITY

According to the present invention, as described above, there is provided an information image utilizing system capable of, in an information image (user information image) for specifying a communication destination user or the like and performing communications and sending and receiving information, setting in detail access rights with respect to performing communications and sending and receiving information through such an information image and to perform authentication based on such access rights.

The invention claimed is:

1. An information image utilization system for performing multimedia file management, the system comprising:
   a plurality of clients, each client having a client identifier; and
   an information image managing server for:
      producing and storing a master information image, the master information comprising specific information including a first client identifier, and related information that the clients can use to perform predetermined actions;
      producing and storing a copy information image, the copy information image comprising attribute information describing access rights for a second client that has ownership of the copy image and access rights for performing the predetermined actions in the related information;
      storing an information image managing table, which associates an identifier of the master image, the first client identifier, an identifier of the copy image, and a second client identifier with each other;
   wherein the first client is for:
      receiving the master image and displaying the master image as an icon;
      displaying the access rights for the second client that has ownership of the copy image by selecting the displayed master image;
      receiving a user input to modify the access rights for the second client; and
      sending an update to the information image managing server based on the user input;
   wherein the update is used to perform at least one of updating the information image managing table or updating copy information image data.

2. The system of claim 1, further comprising at least one folder managing server for storing a folder managing table that associates the second client identifier with the copy image identifier.

3. The system of claim 2, further comprising a user manager server for authenticating the clients and storing a user managing table that associates the client identifiers with folder management servers that the clients may access.

4. The system of claim 3, wherein the clients access the folder managing servers after authentication, display the copy images owned by a particular client, and perform the predetermined actions based on the attribute information contained in the copy image.

5. The system of claim 1, wherein the predetermined actions includes at least one of an electronic mail process, a chat process, an electronic data sending and receiving process, a user information displaying process, a process of updating the copy image, a process of introducing the copy image, and a process of assigning the copy image.

6. The system of claim 1, wherein the at least one information image management server further comprises:
    means for reflecting a change of owner of the copy image in the information image managing table; and means for extracting the identifier of the second client which owns the copy image based on the information image managing table and sending the extracted identifier to the first client, in response to a request from the first client.

7. The system of claim 1, wherein:
    when the information image managing server receives an instruction from the first client to change the attribute information contained in the copy image or to delete the copy image, the at least one information image managing server updates the information image managing table based on the instruction; and
    the at least one folder managing server updates the folder managing table based on the updated at least one information image managing table.

8. The system of claim 1 wherein the information images comprise XML data.

9. A recording medium storing therein a program for enabling a computer to function as a system according to claim 1.

10. A method for performing multimedia file management, the method comprising:
    producing and storing a master information image, the master information comprising specific information including a first client identifier for a first client, and related information that a plurality of clients can use to perform predetermined actions;
    producing and storing a copy information image, the copy information image comprising attribute information describing access rights for a second client that has ownership of the copy image and access rights for performing the predetermined actions in the related information;
    storing an information image managing table, the managing table associating an identifier of the master image, the first client identifier, an identifier of the copy image, and a second client identifier with each other;
    receiving, by the first client, the master image and displaying the master image as an icon;
    displaying the access rights for the second client that has ownership of the copy image by selecting the displayed master image;
    receiving a user input to modify the access rights for the second client; and
    sending an update to the information image managing server based on the user input,
    wherein the update is used to perform at least one of updating the information image managing table or updating copy information image data.

11. The method of claim 10, further comprising:
    storing a folder managing table that associates the second client identifier with the copy image identifier.

12. The method of claim 11, further comprising:
    authenticating a plurality of clients and storing a user managing table that associates client identifiers with folder management servers that the clients may access.

13. The method of claim 12, wherein the clients perform the steps of:
    accessing the folder managing servers after authentication;
    displaying the copy images owned by a particular client, and
    performing the predetermined actions based on the attribute information contained in the copy image.

14. The method of claim 10, wherein the predetermined actions includes at least one of an electronic mail process, a chat process, an electronic data sending and receiving process, a user information displaying process, a process of updating the copy image, a process of introducing the copy image, and a process of assigning the copy image.

15. The method of claim 10, further comprising:
    reflecting a change of owner of the copy image in the information image managing table; and
    extracting the identifier of the second client which owns the copy image based on the information image managing table and sending the extracted identifier to the first client, in response to a request from the first client.

16. The method of claim 10, further comprising:
    updating the information image managing table based on an instruction when the at least on information image managing server receives the instruction from the first client to change the attribute information contained in the copy image or to delete the copy image
    updating the folder managing table based on the updated at least one information image managing table.

17. The method of claim 10 wherein the information images comprise XML data.

* * * * *

UNITED STATES PATENT AND TRADEMARK OFFICE
CERTIFICATE OF CORRECTION

PATENT NO. : 7,523,199 B2  Page 1 of 1
APPLICATION NO. : 10/478469
DATED : April 21, 2009
INVENTOR(S) : Fumio Tsuyama et al.

It is certified that error appears in the above-identified patent and that said Letters Patent is hereby corrected as shown below:

In claim 5, column 27, line 9, change "includes" to --include--.

In claim 14, column 28, line 30, change "includes" to --include--.

In claim 16, column 28, line 44, change "on" to --one--.

In claim 16, column 28, line 47, change "delete the copy image" to --delete the copy image; and--.

Signed and Sealed this

Twenty-seventh Day of October, 2009

David J. Kappos
*Director of the United States Patent and Trademark Office*